US008279928B2

(12) United States Patent
Fukuzawa

(10) Patent No.: US 8,279,928 B2
(45) Date of Patent: Oct. 2, 2012

(54) IMAGE ENCODING APPARATUS AND ENCODING METHOD, IMAGE DECODING APPARATUS AND DECODING METHOD

(75) Inventor: Keiichi Fukuzawa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1551 days.

(21) Appl. No.: 11/743,473

(22) Filed: May 2, 2007

(65) Prior Publication Data

US 2007/0263722 A1   Nov. 15, 2007

(30) Foreign Application Priority Data

May 9, 2006 (JP) .................. 2006-130882
May 9, 2006 (JP) .................. 2006-130883

(51) Int. Cl.
*H04B 1/66* (2006.01)
(52) U.S. Cl. ......... 375/240.13; 375/240.12; 375/240.19; 382/232; 382/236
(58) Field of Classification Search ............ 375/240.12, 375/240.26, 240.13, 240.19; 382/233, 232, 382/236
See application file for complete search history.

(56) References Cited

U.S. PATENT DOCUMENTS

| | | | | |
|---|---|---|---|---|
| 5,751,893 A * | 5/1998 | Shimoda et al. | ............... | 386/220 |
| 6,363,212 B1 * | 3/2002 | Fujinami et al. | ............. | 386/338 |
| 6,463,101 B1 * | 10/2002 | Koto | .................. | 375/240.13 |
| 7,113,542 B2 * | 9/2006 | Tanaka | .................. | 375/240.01 |
| 7,209,520 B2 * | 4/2007 | Kadono et al. | ............ | 375/240.13 |
| 2002/0136301 A1 * | 9/2002 | Yoneyama et al. | ...... | 375/240.13 |
| 2004/0081428 A1 | 4/2004 | Funakoshi et al. | ............. | 368/68 |
| 2006/0003814 A1 | 1/2006 | Moody et al. | ................. | 455/567 |
| 2006/0274159 A1 | 12/2006 | Kobayashi | ............... | 348/222.1 |
| 2006/0291807 A1 | 12/2006 | Ryu et al. | ......... | 386/95 |
| 2007/0003149 A1 | 1/2007 | Nagumo et al. | ............. | 382/233 |
| 2008/0019445 A1 | 1/2008 | Aono et al. | ............. | 375/240.12 |

FOREIGN PATENT DOCUMENTS

| | | |
|---|---|---|
| JP | 05-308628 | 11/1993 |
| JP | 08-140100 | 5/1996 |
| JP | 2004-140723 A | 5/2004 |
| JP | 2004-328511 | 11/2004 |
| WO | WO 2006/003814 A1 | 1/2006 |
| WO | WO 2006/030694 A1 | 3/2006 |

* cited by examiner

*Primary Examiner* — Kim Vu
*Assistant Examiner* — Suman Debnath
(74) *Attorney, Agent, or Firm* — Fitzpatrick, Cella, Harper & Scinto

(57) ABSTRACT

An encoding method and apparatus which include a coded picture that enables special playback to be easily performed while suppressing reduction in coding efficiency are provided. Coding is performed per a certain number of pictures, including pictures for special playback. When coded pictures for special playback using an interframe predictive coding scheme, referencing is limited to coded pictures encoded using an intraframe predictive coding scheme or coded pictures encoded using the interframe predictive coding scheme having the same reference limitation.

17 Claims, 13 Drawing Sheets

IMAGE ENCODING APPARATUS AND ENCODING METHOD, IMAGE DECODING APPARATUS AND DECODING METHOD

BACKGROUND OF THE INVENTION

1. Field of the Invention

The present invention relates to a technique for encoding image information, particularly moving picture information, and a technique for decoding encoded moving picture information.

2. Description of the Related Art

In recent years, the needs for higher definition in image information have increased. Accordingly, television broadcasting is undergoing a transition from conventional SD (standard definition) with 720×480 pixels to HD (high definition) with 1920×1080 pixels.

The increase in data volume associated with higher definitions has led to demands for the development of a coding algorithm having higher efficiency. Efforts towards standardization of a compression coding scheme using interframe prediction are currently underway by ITU-T SG16 and ISO/IEC JTC1/SC29/WG11.

As it stands, the H.264/AVC (MPEG-4 PART10) encoding scheme is considered to have the highest encoding efficiency. One of the technical features newly introduced to this coding scheme allows selection of a reference picture to be used in interframe predictive coding from a plurality of frames. In other words, even a temporally-distant picture frame may be used as a reference picture if an improvement in coding efficiency may be expected.

However, the realization of high-efficiency coding by allowing such flexible selection of a reference picture presents a problem during special playback (refer to Japanese Patent Laid-Open No. 2004-328511 [reference document D1])

Conventionally, with the MPEG2 scheme widely used for coding moving picture information, coding of each picture frame is performed through any of intraframe coding, forward direction interframe coding and bidirectional interframe coding. Depending on which of those coding schemes is applied, the coded frame is referred to either as an I-picture, a P-picture or a B-picture.

With the MPEG2 scheme, a reference picture of a P-picture is limited to an immediately-preceding I-picture or P-picture. This allows only I-pictures and P-pictures to be extracted, and enables correct decoding and playback. As a result, for instance, fast playback is easily achieved.

However, the H.264 scheme not only allows a P-picture to use a plurality of pictures as a reference picture, but also allows a B-picture to be used as a reference picture. Therefore, when attempting playback by extracting only I-pictures and P-pictures from a coded image stream, it is difficult to perform normal decoding on a P-picture that uses a B-picture as a reference picture.

According to reference document D1, when performing fast playback, for an interval between an I-picture and a picture immediately preceding the next I-picture, a group of temporally-consecutive frames from the I-picture to at least a first P-picture is decoded. Subsequently, only I-pictures and P-pictures included in the decoded frame group are played back.

As described above, with the H. 264 scheme, as a result of allowing flexible selection of a reference picture during interframe coding, in principle, only I-pictures may be used for special playback.

Reference document D1 describes that an I-picture and a P-picture may be decoded if the pictures between the I-picture and the P-picture are removed. However, since the H.264/AVC standard allows a B-picture referenced by a P-picture to reference a picture that is even older than an I-picture, there is a risk that the P-picture may not be decodable. Measures for such cases are not disclosed in reference document D1.

While encoding for special playback mode may conceivably be performed by increasing the I-pictures, such encoding will reduce coding efficiency, and as a result, the feature of the H.264 scheme in that high-efficiency coding is realized by allowing flexible reference relationships may no longer be utilized.

In addition, the MPEG scheme manages a picture group consisting of a predetermined number of consecutive pictures as a group of pictures (GOP), and manages coding on a per-GOP basis. While it is desirable to increase the number of pictures configuring a GOP in order to achieve high-efficiency coding, reference document D1 does not provide a description on a special playback method in a case where a GOP structure changes during coding.

SUMMARY OF THE INVENTION

The present invention solves at least one of the above-described problems encountered in the prior art.

More specifically, the present invention provides an encoding apparatus and a coding method capable of coding moving picture information while suppressing decrease in coding efficiency and including coded pictures enabling easy playback.

In addition, the present invention further provides an encoding apparatus and a coding method capable of coding moving picture information while suppressing decrease in coding efficiency and including coded pictures enabling easy playback, even when the number of pictures composing a group changes.

Furthermore, the present invention yet further provides a decoding apparatus and a decoding method which decode moving picture information that has been coded by the encoding apparatus and the coding method according to the present invention.

According to the present invention, there is provided an encoding apparatus which encodes each picture composing a moving picture using either an intraframe predictive coding scheme or an interframe predictive coding scheme, the encoding apparatus comprising:

control unit which selects a coding scheme to be applied to each picture; and coding unit which encodes each picture based on the coding scheme selected by the control unit, wherein the control unit selects:

for each picture corresponding to a predetermined period, either the intraframe predictive coding scheme or the interframe predictive coding scheme in which reference pictures are limited to another picture corresponding to the predetermined period; and for other pictures, either the intraframe predictive coding scheme or the interframe predictive coding scheme in which no limitations are placed on reference pictures.

According to another present invention, there is provided an encoding apparatus which encodes each picture composing a moving picture using either an intraframe predictive coding scheme or an interframe predictive coding scheme, the encoding apparatus comprising:

determination unit which determines for each group a number of pictures to be managed as a group;

control unit which selects on a per-group basis a coding scheme to be applied to each picture; and coding unit which encodes each picture based on a coding scheme selected by the control unit, wherein the control unit selects:

for each of the groups, the intraframe predictive coding scheme for a picture existing at the same position from the top of the group, and for groups in which the number of pictures determined by the determination unit exceed a predetermined value, the interframe predictive coding scheme in which reference pictures are limited to pictures that are decodable only from coded data from a picture in the same group for which the intraframe predictive coding scheme has been selected to a immediately-preceding picture with respect to pictures corresponding to a period having the predetermined value among pictures included in the group for which the intraframe predictive coding scheme has been selected.

According to still another present invention, there is provided a decoding apparatus which receives and decodes coded moving picture information, wherein the coded moving picture information includes: coded data composed of a first picture coded using the intraframe predictive coding scheme, a second picture coded using the interframe predictive coding scheme and for which reference pictures are limited to the first picture or another second picture, and a third picture coded using the interframe predictive coding scheme in which no limitations are placed on reference pictures; and information indicating a coding scheme used for the coding of each picture, the decoding apparatus comprising:

acquisition unit which acquires the information indicating a coding scheme from the moving picture information;

decoding unit which decodes coded data included in the moving picture information based on the information indicating a coding scheme acquired by the acquisition unit;

detection unit which detects an execution instruction for fast playback; and playback control unit which decodes only the first and second pictures among the coded data when the execution instruction for fast playback is detected by the detection unit, and decoding the first, second and third pictures when the execution instruction for fast playback is not detected by the detection unit.

According to still another present invention, there is provided an encoding method for encoding each picture composing a moving picture using either an intraframe predictive coding scheme or an interframe predictive coding scheme, the encoding method comprising:

a control step for selecting a coding scheme to be applied to each picture; and a coding step for encoding each picture based on a coding scheme selected in the control step, wherein the control step selects:

for each picture corresponding to a predetermined period, either the intraframe predictive coding scheme or the interframe predictive coding scheme in which reference pictures are limited to another picture corresponding to the predetermined period; and for other pictures, either the intraframe predictive coding scheme or the interframe predictive coding scheme in which no limitations are placed on reference pictures.

According to still another present invention, there is provided an encoding method for encoding each picture composing a moving picture using either an intraframe predictive coding scheme or an interframe predictive coding scheme, the encoding apparatus comprising:

a determination step for determining for each group a number of pictures to be managed as a group;

a control step for selecting on a per-group basis a coding scheme to be applied to each picture; and a coding step for encoding each picture based on a coding scheme selected in the control step, wherein the control step selects:

for each of the groups, the intraframe predictive coding scheme for a picture existing at the same position from the top of the group, and for groups in which the number of pictures determined in the determination step exceed a predetermined value, the interframe predictive coding scheme in which reference pictures are limited to pictures that are decodable only from coded data from a picture in the same group for which the intraframe predictive coding scheme has been selected to a immediately-preceding picture with respect to pictures corresponding to a period having the predetermined value among pictures included in the group for which the intraframe predictive coding scheme has been selected.

According to still another present invention, there is provided a decoding method for receiving and decoding coded moving picture information, wherein the coded moving picture information includes: coded data composed of a first picture coded using the intraframe predictive coding scheme, a second picture coded using the interframe predictive coding scheme and for which reference pictures are limited to the first picture or another second picture, and a third picture coded using the interframe predictive coding scheme in which no limitations are placed on reference pictures; and information indicating a coding scheme used for the coding of each picture, the decoding method comprising:

an acquisition step for acquiring the information indicating a coding scheme from the moving picture information;

a decoding step for decoding coded data included in the moving picture information based on the information indicating a coding scheme acquired in the acquisition step;

a detection step for detecting an execution instruction for fast playback; and a playback control step for decoding only the first and second pictures among the coded data when the execution instruction for fast playback is detected in the detection step, and decoding the first, second and third pictures when the execution instruction for fast playback is not detected in the detection step.

Further features of the present invention will become apparent from the following description of exemplary embodiments (with reference to the attached drawings).

DESCRIPTION OF THE EMBODIMENTS

First Embodiment

Figure 2:
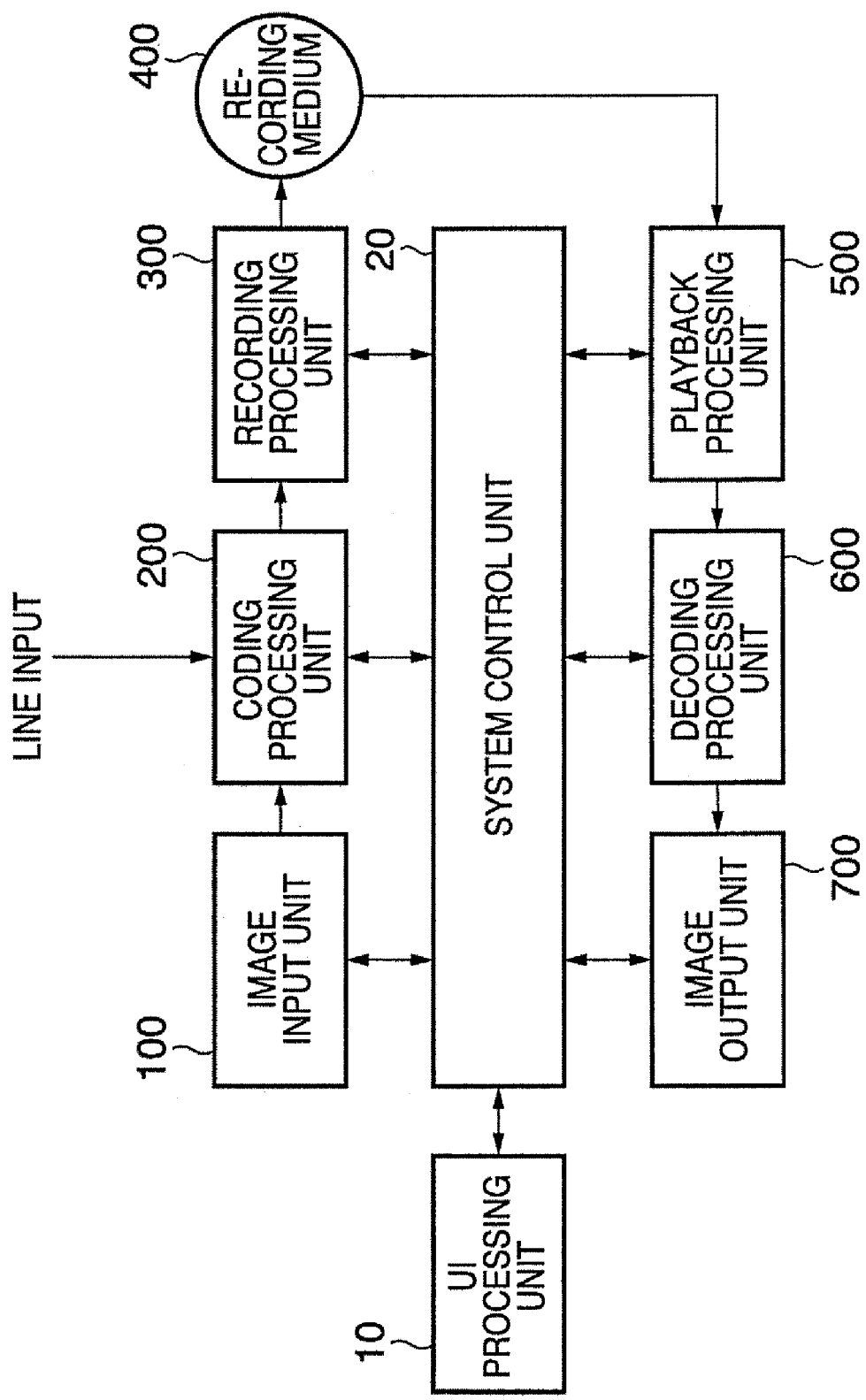
FIG. 2 is a block diagram showing an exemplary configuration of a video camera as an example of an image encoding apparatus and an image decoding apparatus according to an embodiment of the present invention.

FIG. 2 is a block diagram showing an exemplary configuration of a video camera (video camcorder) as an example of both an image encoding apparatus and an image decoding apparatus according to a first embodiment of the present invention.

In FIG. 2, a UI processing unit 10 comprises a switch, a button, a touch panel or a dial and the like, and is used by the user to issue operation instructions to the video camera or configure settings of the same. Operations performed on the UI processing unit 10 are transmitted to a system control unit 20.

The system control unit 20 is a microcomputer or the like, and controls the entire video camera by executing a control program stored in, for instance, an internal ROM to control operations of the respective units. An image input unit 100 comprises a lens, an imaging element, an A/D converter and the like. The image input unit 100 converts a subject image into digital data, and outputs the digital data. A coding processing unit 200 performs compression coding on digital image data from the image input unit 100.

A recording processing unit 300 records digital image data compression-coded by the coding processing unit 200 onto a recording medium 400 such as a tape, a disk or a semiconductor memory under a predetermined recording scheme. A playback processing unit 500 reads out coded image data from the recording medium 400. A decoding processing unit 600 decodes coded image data read out by the playback processing unit 500. An image output unit 700 comprises a display unit such as an LCD, and displays decoded image data and setting screens or the like.

Recording operations performed by a video camera configured as described above will now be described.

When a user instructs commencement of recording via the UI processing unit 10, the system control unit 20 controls the image input unit 100, the coding processing unit 200 and the recording processing unit 300 to commence recording processing. During recording, a subject image is captured by the image input unit 100, and is then output as digital image data. Image data is coded by the coding processing unit 200, and is output as coded image data with a compressed data volume.

In the present embodiment, the coding processing unit 200 also performs processing of pictures for special playback, which will be described later. Coded image data is subjected to signal processing adapted to the recording medium 400 in the recording processing unit 300, and subsequently recorded onto the recording medium 400.

In addition to image data input from the image input unit (camera) 100, the video camera according to the present invention is capable of coding and recording image data input (line-input) from outside of the video camera via an external input terminal, not shown.

Next, special playback operations will be described. When a user instructs commencement of special playback via the UI processing unit 10, the system control unit 20 controls the playback processing unit 500, the decoding processing unit 600 and the image output unit 700 to commence special playback processing.

The playback processing unit 500 reads out coded image data of special playback pictures, which will be described later, from coded image data recorded on the recording medium 400, and performs signal processing appropriate for decoding processing on the read-out data. Read-out coded image data of special playback pictures is decoded into image data at the decoding processing unit 600. Decoded image data is sequentially output by the image output unit 700, and special playback display is achieved.

(Coding Processing)

A configuration and operations of the coding processing unit 200 according to the present embodiment will now be described.

Figure 3:
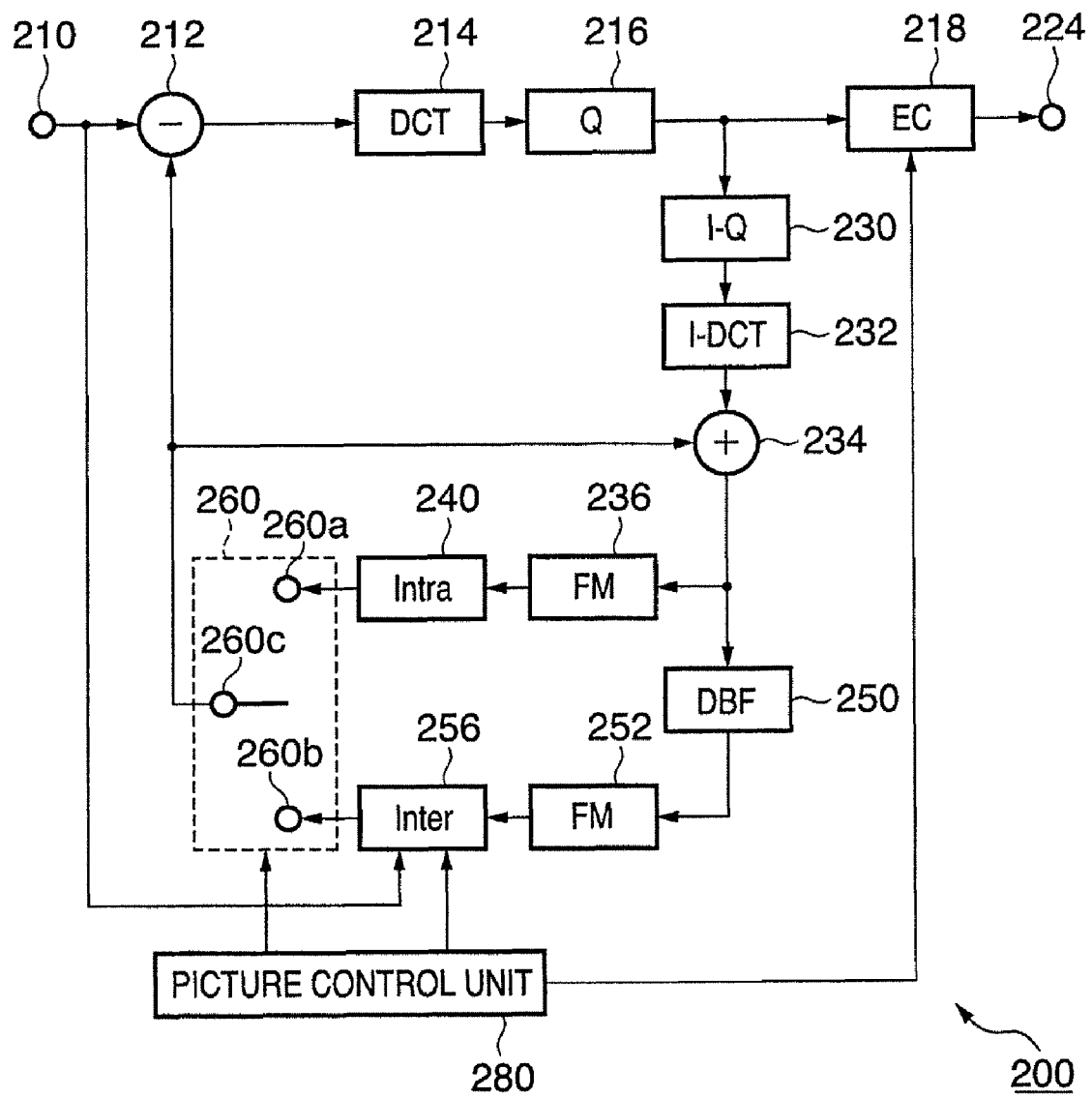
FIG. 3 is a block diagram showing an exemplary configuration of a coding processing unit according to an embodiment of the present invention.

FIG. 3 is a block diagram showing an exemplary configuration of the coding processing unit 200 according to the present embodiment.

In FIG. 3, digital image data output by the image input unit 100 is supplied via a picture image input 210. A subtracter 212 subtracts predictive picture information, to be described later, from input image data. A converter (DCT) 214 applies 4 by 4 integer orthogonal transform onto picture difference data (prediction error data) output by the subtracter 212.

A quantization unit (Q) 216 performs quantization at a predetermined quantization scale on a transform coefficient output by the converter 214. An entropy coding unit (EC) 218 performs entropy coding processing on the quantized transform coefficient to perform data compression.

An inverse quantization unit (I-Q) 230 performs inverse quantization processing on the quantized transform coefficient. An inverse converter (I-DCT) 232 performs inverse integer orthogonal transform on the inverse-quantized transform coefficient to restore picture difference data. An adder 234 adds predictive image data, which will be described later, to the restored picture difference data.

A first frame memory (FM) 236 retains image data (local-decoded image data) restored from predictive image data, which will be described later. An intra-predictive coding unit (Intra) 240 segments image data retained in the first frame memory 236 into predetermined block units, and generates predictive image data by predicting image data of each block from surrounding pixels thereof. A switching unit 260 outputs as predictive image data an output from either the intra-predictive coding unit 240 or an inter-predictive coding unit 256, which will be described later, according to the control of a picture control unit 280.

A deblocking filter (DBF) 250 corrects discontinuity (so-called block noise) occurring at coding unit blocks in image data restored from predictive image data, to be described later. A second frame memory 252 retains restored image data, on which block boundary correction processing has been performed, for use as a reference picture of predictive image data, to be described later.

The inter-predictive coding unit 256 obtains motion information from current image data input from the image input unit 210 and a reference picture retained in the second frame memory 252, and generates predictive image data of the current image data. The picture control unit 280 determines for each picture (frame) a predictive coding method to be applied thereon.

Next, coding operations will be described.

The subtracter 212 subtracts predictive image data from image data input from the image input unit 210 to obtain difference data with respect to the predictive image data. The difference data is subjected to integer orthogonal transform such as DCT by the converter 214, and is transformed into frequency component data. A transform coefficient corresponding to each frequency component is quantized by a predetermined step width by the quantization unit 216. The quantized transform coefficient data is compression-coded at the entropy coding unit 218. Furthermore, multiplexing and compression coding performed by the entropy coding unit 218 also includes information regarding predictive-coded pictures, to be described later.

Next, processing of predictive image data will be described. Methods of generating predictive image data include an intra-predictive coding scheme which references within an input coding object image, and an inter-predictive coding scheme which references images other than an input coding object image.

First, a method of generating predictive image information according to the intra-predictive coding scheme will be described.

A transform coefficient quantized by the quantization unit 216 is inverse-quantized by the inverse quantization unit 230 to restore the transform coefficient. The restored transfer coefficient is restored as difference data between input image data and predictive image data by further performing an inverse integer orthogonal transform at the inverse transform unit 232. Restored image data (local-decoded image data) of the input image is obtained by adding predictive image data, which will be described later, to the restored difference data at the adder 234.

The restored image data is stored in the first frame memory 236. Subsequently, intra-predictive coding is performed on the restored image data using the intra-predictive coding unit 240. More specifically, restored image data is segmented into units of blocks having a predetermined size, and restored image data within each block is predicted from peripheral pixel values of the block. Predictive image data is sent to the switch unit 260. The switch unit 260 is controlled by the picture control unit 280, which will be described later. When outputting predictive image data according to the intra-predictive coding scheme, the picture control unit 280 causes a switching unit 260c to select 260a.

Predictive image data according to the intra-predictive coding scheme is sent from the switch unit 260 to the subtracter 212 or the adder 234 to be used to generate predictive image difference data and restored image data.

Next, a method of generating predictive image data according to the inter-predictive coding scheme will be described.

Processing up to obtaining restored image data by the adder 234 is the same as described above. Thus, a description thereon will be omitted. Restored image data obtained at the adder 234 is sent to the deblocking filter unit 250 for removal of discontinuity (block noise) in data at block boundaries, which will be described later. The deblocking filter unit 250 performs predetermined filtering processing on data of pixels adjacent to block boundaries, and suppresses discontinuities in data of block boundaries. However, the deblocking filter is optional, and filtering processing need not be performed when it is determined that the level of block noise in restored image data is sufficiently low.

The restored image data after filtering processing is stored in the second frame memory 252. The second frame memory 252 has sufficient capacity for retaining restored image data corresponding to a plurality of frames (pictures).

The inter-predictive coding unit 256 obtains on a per-block basis a correlation between an input image that is a predictive coding object, which is supplied from the image input unit 210, and a plurality of restored image data stored in the second frame memory 252. A relative positional relationship between a coding object block and a block having the highest correlation among blocks in the restored image data is detected as motion information. Furthermore, the inter-predictive coding unit 256 generates predictive image data based on the motion information and restored image data.

The generated predictive image data according to the inter-predictive coding scheme is sent to the switch unit 260. The switch unit 260 is controlled by the picture control unit 280, which will be described later. When outputting predictive image data according to the inter-predictive coding scheme, the picture control unit 280 causes the switching unit 260c to select 260b.

Predictive image data according to the inter-predictive coding scheme is sent from the switch unit 260 to the subtracter 212 or the adder 234 to be used to generate predictive image difference data and restored image data.

Depending on a predetermined method for selecting a predictive coding scheme, in the case of the intra-predictive coding scheme (I), the picture control unit 280 connects the switching unit 260c to 260a, and in the case of the inter-predictive coding scheme (P, B), connects the switching unit 260c to 260b.

Furthermore, in the case of the inter-predictive coding scheme, the picture control unit 280 generates for the inter-predictive coding unit 256, on a per-picture basis, an instruction for either a forward prediction inter-predictive coding scheme (forward prediction scheme: P) or a bidirectional prediction inter-predictive coding scheme (bidirectional prediction scheme: B).

The forward prediction scheme is an inter-predictive coding scheme in which reference image data to be used for predictive coding is limited to restored image data restored from a single image that comes before the coding object picture in the display order. On the other hand, the bidirectional prediction scheme does not have such limitations regarding display order, and enables predictive coding by referencing restored image data that is restored from up to images.

The predictive coding scheme (I, P, B) selected on a per-picture basis at the picture control unit 280 is sent to the entropy coding unit 218 to be multiplexed into coded data.

While the present embodiment is described for simplicity as being arranged to select a predictive coding scheme on a per-picture basis, a predictive coding scheme may be selected per slice, which is composed of one or more pixel blocks (macro block), instead of per picture. Additionally, in any case, a different predictive coding scheme may be applied on a per-pixel block basis. For instance, either the intra-predictive scheme or the forward prediction scheme may be selected for pixel blocks composing a P-picture (P slice), while any of the intra-predictive scheme, the forward prediction scheme or the bidirectional prediction scheme may be selected for pixel blocks composing a B-picture (B slice). In addition, only the intra-predictive scheme may be selected for pixel blocks composing an I-picture (I slice).

Through such association of coding schemes, an I-picture may be decoded only from coded data of the I-picture, while a P-picture may be decoded from coded data of the P-picture and coded data of a single reference picture.

A method for selecting a predictive coding scheme according to the present embodiment will be described below.

Figure 5:
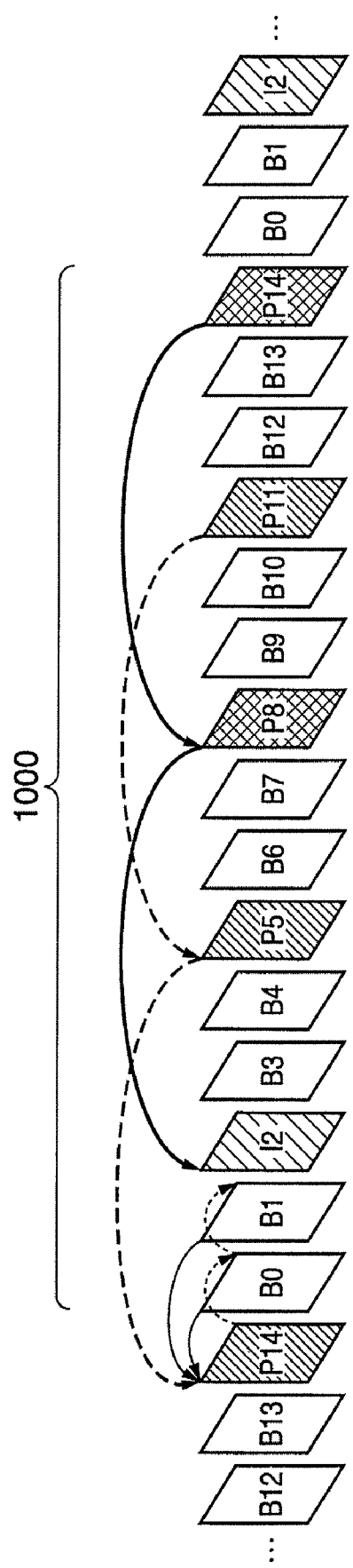
FIG. 5 is a schematic diagram describing a coding object picture to be input to the coding processing unit shown in FIG. 2 and an example of reference relationships permitted in the H.264 coding scheme.

FIG. 5 is a schematic diagram describing a coding object picture to be input to the coding processing unit 200 shown in FIG. 2 and an example of reference relationships permitted in the H.264 coding scheme.

In FIG. 5, reference characters I, P and B respectively denote an aforementioned intra-predictive coded picture (I-picture), a forward predictive-coded picture (P-picture) and a bidirectional predictive-coded picture (B-picture) which are sequentially input to the coding processing unit 200 shown in FIG. 2 from the picture shown in the left side of FIG. 2. The input order is the same as the display order after decoding.

In the present embodiment, I-pictures are set at 15-picture intervals. A group consisting of a plurality of coded pictures which includes at least one I-picture is referred to as a group of pictures (GOP), and is managed separately. In FIG. 5, a picture group 1000 consisting of 15 pictures from B0 to P14 is one GOP.

As described above, an I-picture may be decoded using only coded data of an I-picture. Therefore, by managing positions of I-pictures in each GOP, it is now possible to retrieve coded data of I-pictures from the coded data and decode the retrieved coded data. In the present embodiment, decoding display may be performed at 15-picture intervals. By displaying I-pictures retrieved and decoded from respective GOPs at a normal frame rate, a special playback display equivalent to 15 times normal speed may be realized.

Additionally, in FIG. 5, the numerals 0 to 14 succeeding the characters I, P and B represent sequences of per-GOP input to the coding processing unit 200 shown in FIG. 2.

Furthermore, the arrows shown in FIG. 5 denote reference image data to be used by an inter-predictive coded picture (a P-picture or a B-picture). In other words, in the present example, a picture P5 references the picture P14 in the preceding GOP. The picture P11 references the picture P5. The picture P8 references the picture I2. The picture P14 references the picture P8. On the other hand, the picture B0 references both pictures P14 and B1. The picture P1 references both pictures P14 and I2.

As seen, the H.264 enables a P-picture to reference an I-picture or a P-picture that is not in the immediate vicinity of the P-picture, and although not shown, the H.264 scheme also allows referencing of a B-picture. In addition, the H.264 scheme also allows referencing by a B-picture of other B-pictures, or referencing a picture that is more temporally-distant than the nearest I-picture or P-picture. By allowing such flexible reference picture selection, a picture having the highest correlation may be selected as a reference picture. As a result, high-efficiency coding is achieved.

However, as described above, allowing unrestricted reference as shown in FIG. 5 has adverse effects during special playback and, in particular, during fast playback. In FIG. 5, since one GOP is composed of 15 pictures, playback display at 15 times normal speed is realized by decoding only I-pictures included in each GOP. However, performing display at, for instance, six times normal speed will additionally require decoding of P-pictures.

Next, a principle of selection of a coding prediction scheme by the picture control unit 280 according to the present embodiment will be described with reference to FIG. 6.

Figure 6:
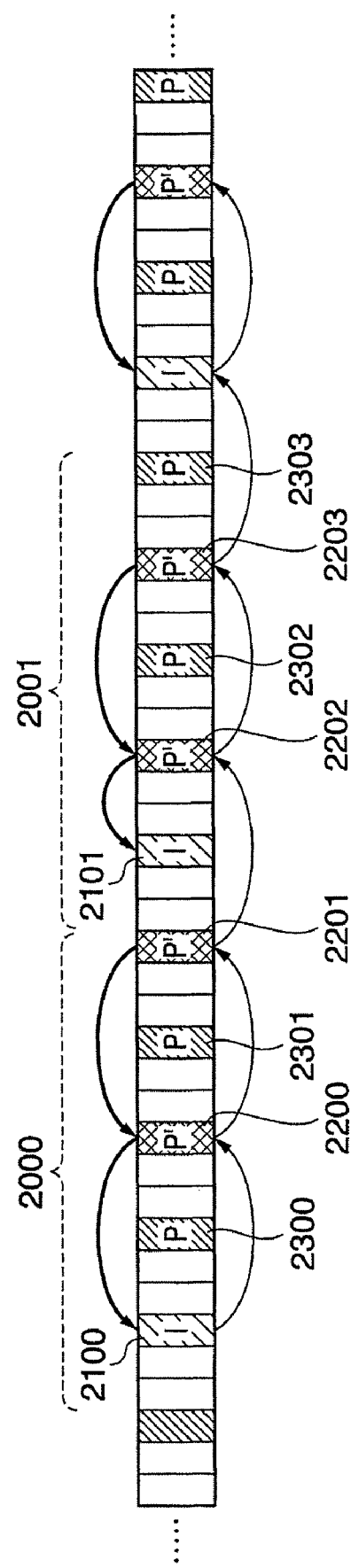
FIG. 6 is a diagram describing a method for selecting a coding prediction scheme according to the first embodiment of the present invention.

In FIG. 6, reference numerals 2000 and 2001 denote GOPS, reference numerals 2100 and 2101 denote I-pictures, and reference numerals 2200 to 2203 and 2300 to 2303 denote P-pictures.

In this case, the P-picture 2200 circumvents the nearest P-picture 2300 and references the I-picture 2100 in the same GOP 2000. Similarly, the P-picture 2201 circumvents the nearest P-picture 2301 and references the P-picture 2200 in the same GOP 2000. Furthermore, the P-picture 2202 references the nearest I-picture 2101 in the same GOP 2001. Moreover, the P-picture 2203 circumvents the nearest P-picture 2302 and references the P-picture 2202 in the same GOP 2001.

According to the present embodiment, the I-picture 2100 and the P-pictures 2200 to 2203 are arranged in regular six picture intervals. In addition, a reference relationship is maintained which enables decoding of all pictures if the I-picture 2101 is decoded in addition to the above-mentioned pictures 2100 and 2200 to 2203. In the case of the present embodiment, since a decodable picture exists for every six pictures (every sixth picture), playback display at six times normal speed may be realized by extracting such pictures and displaying the same at a normal frame rate.

As seen, in the present embodiment, the reference picture of a forward predictive-coded picture used for fast playback display is limited to an I-picture or a preceding P-picture separated by a number of pictures corresponding to playback speed within the same GOP. As a result, the decoding of an I-picture and the decoding of pictures at regular intervals composed of reference-limited P-pictures may be achieved solely by coded data of I-pictures or P-pictures at regular intervals in the same GOP.

In other words, an arbitrary playback speed may be achieved by arranging I-pictures and P-pictures for special playback (i.e. reference-limited P-pictures) at regular intervals.

Figure 1:
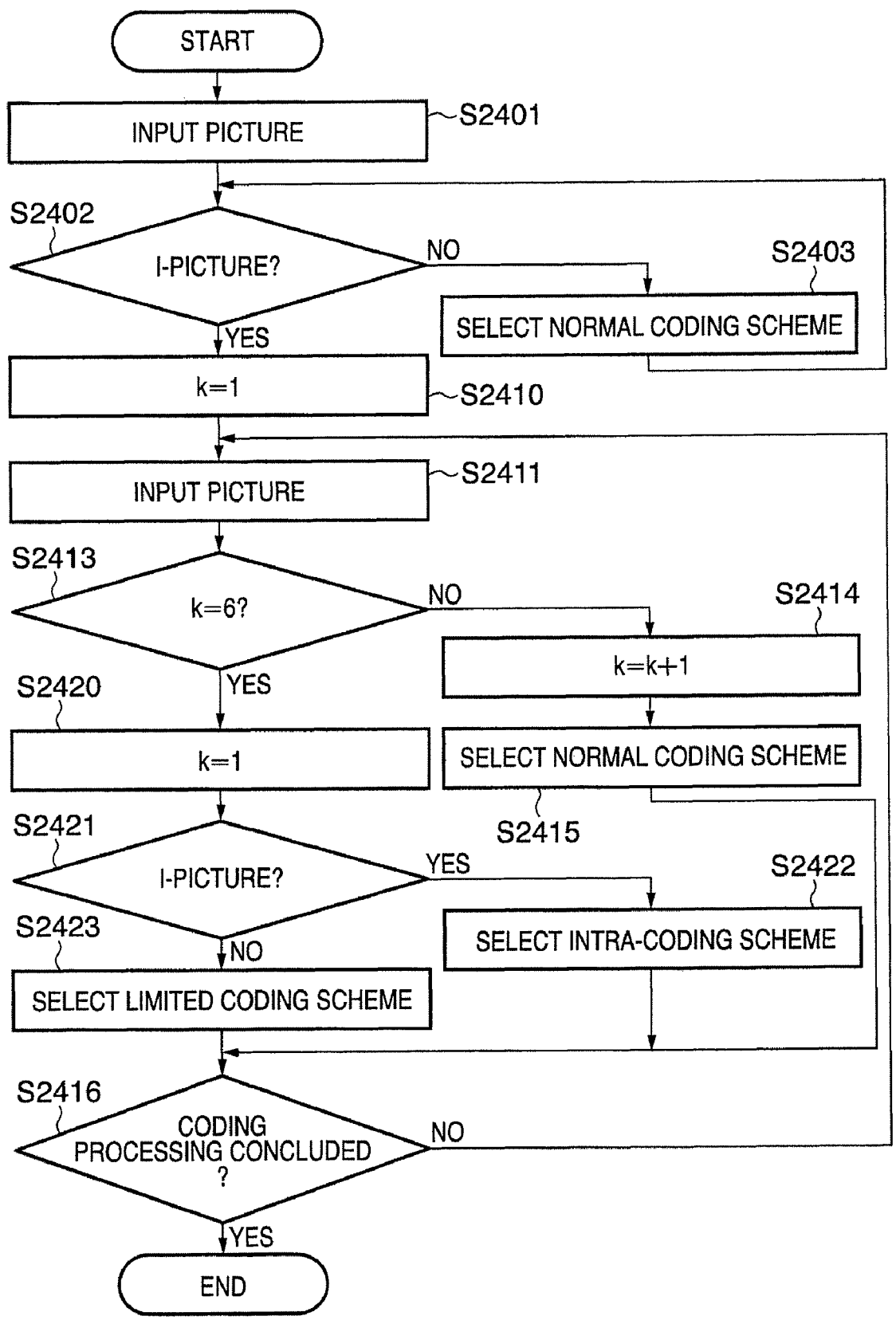
FIG. 1 is a flowchart describing an operation for coding scheme selection by a coding processing unit according to a first embodiment of the present invention.

Next, operations for selecting a coding scheme performed by the coding processing unit 200 according to the present embodiment will be described with reference to the flowchart shown in FIG. 1.

First, upon coding, selection of a coding scheme for each picture is commenced. When a coding object picture is input to the coding processing unit 200 (S2401), the coding processing unit 200 determines using a predetermined method whether the intraframe coding scheme should be used for the input picture (S2402). If the intraframe coding scheme is not applied, the coding processing unit selects a normal method performed according to the H.264 scheme as the coding scheme (S2403). Generally, the bidirectional predictive coding scheme is selected and determined for the first two input pictures.

On the other hand, if the intraframe coding scheme is selected (S2402), the coding processing unit 200 initializes a counter (variable k) to 1, and performs intraframe coding processing on the input picture (S2410). When the next picture is input to the coding processing unit (S2411), the coding processing unit 200 determines whether the counter value k is 6 (S2413). If not k=6, the counter value is incremented by 1 (S2414), and a coding scheme is determined using a normally performed predetermined method (S2415). After performing coding processing under the selected coding scheme, the coding processing unit 200 determines whether an instruction for terminating coding processing has been issued (S2416). If a termination instruction has not been issued, a picture will be input in succession to the coding processing unit 200 (S2411). If a termination instruction has been issued, coding processing as well as selection of coding schemes will be terminated.

On the other hand, if counter value k=6 in S2413, the coding processing unit 200 first resets the counter value k to 1 (S2420), and in the same manner as in S2402, determines whether the input picture is to be an I-picture or not (S2421). When it is determined that the input picture is to be an I-picture, the coding processing unit 200 selects the intraframe coding scheme (S2422), and proceeds to S2416.

When it is determined in S2421 that the input picture is not to be an I-picture, the coding processing unit 200 selects the forward predictive coding scheme that limits reference locations (S2423) In other words, as described with reference to FIG. 6, the forward predictive coding scheme is selected in which an I-picture or a P-picture coded under a similar reference limitation (limited P-picture) within the same GOP is used as a reference picture.

Coded image data of a limited P-picture is multiplexed by metadata indicating that the limited P-picture is indeed a limited P-picture.

Next, a playback method for a limited P-picture will be described with reference to FIG. 4.

Figure 4:
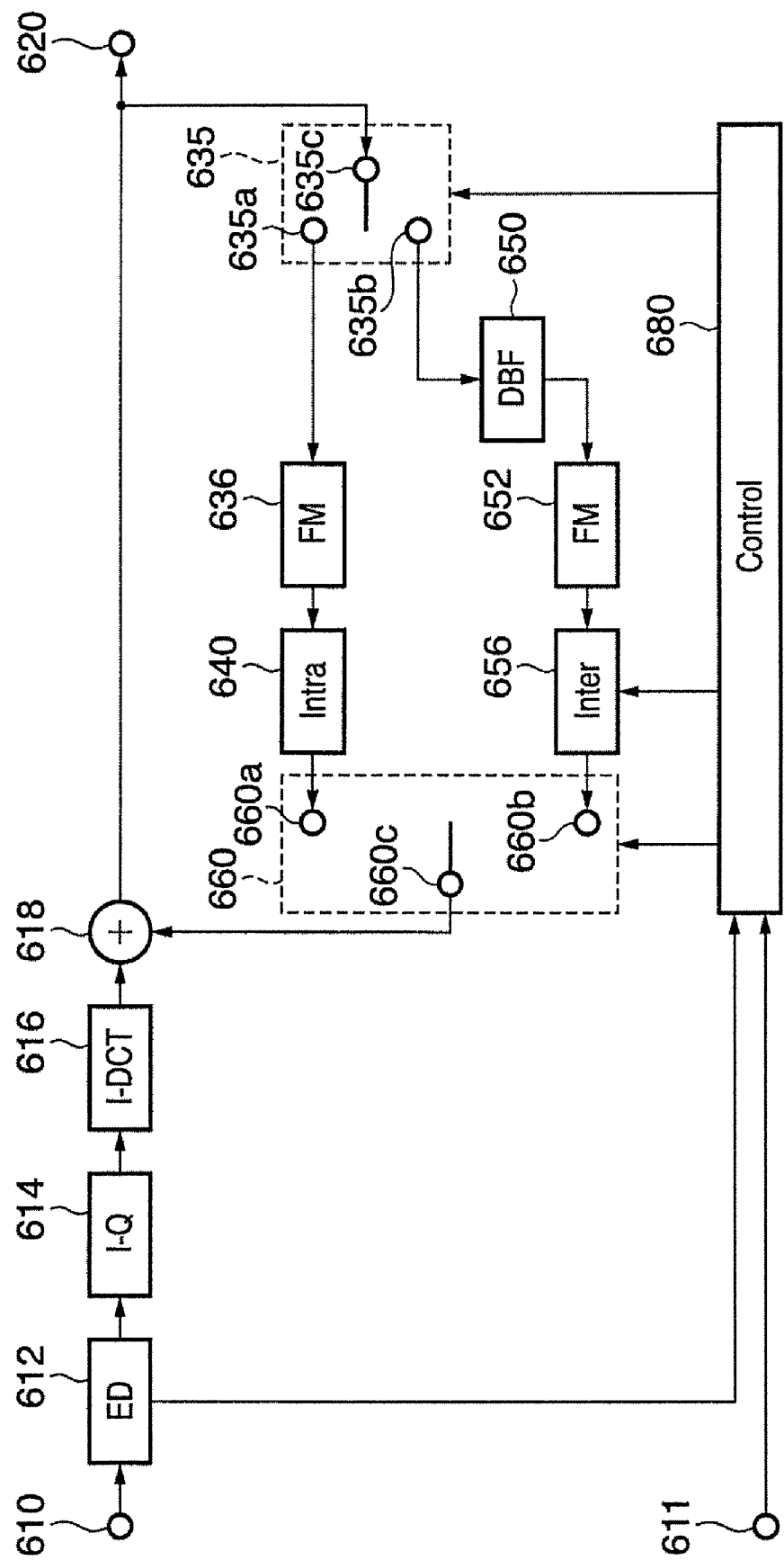
FIG. 4 is a block diagram showing an exemplary configuration of a decoding processing unit according to an embodiment of the present invention.

FIG. 4 is a block diagram showing an exemplary configuration of the decoding processing unit 600 shown in FIG. 2.

Coded data from the playback processing unit 500 is input from a data input unit 610. In addition, an instruction for decoding processing from the control unit (denoted by reference numeral 20 in FIG. 2) for the entire system is inputted via a control input unit 611. An entropy decoding processing unit 612 performs decoding processing on entropy-coded data to perform data expansion. The entropy decoding processing unit 612 also generates metadata such as motion information and the like that is multiplexed on coded data.

An inverse quantization unit (I-Q) 614 performs inverse quantization at a predetermined quantization scale on entropy-decoded digital data, and calculates an integer transform coefficient. An inverse converter (I-DCT) 616 performs an inverse integer orthogonal transform on the calculated integer transform coefficient to restore image data. An adder 618 adds predictive image data, which will be described later, to the restored image data.

A switch unit 635 is controlled by a prediction scheme control unit 680, and outputs the output of the adder 618 (decoded image data) to either a third frame memory (FM) 636 or a deblocking filter unit (DBF) 650. The third frame memory 636 retains decoded image data supplied from the switch unit 635. An intra-predictive decoding unit 640 predicts image data in a block to be decoded from peripheral pixels of the block, using image data retained in the third frame memory 636. A switch unit 660 is controlled by the prediction scheme control unit 680, and outputs to the adder 618 either the output of the intra-predictive decoding unit 640 or the output of an inter-predictive decoding unit 656.

The deblocking filter unit 650 corrects discontinuity at block boundaries of the decoded image data. A fourth frame memory 652 retains as reference pictures local-decoded image data on which block boundary correction processing has been performed.

The inter-predictive decoding unit 656 generates predictive image data using a plurality of reference pictures retained in the fourth frame memory and metadata such as motion information generated in the entropy decoding processing.

The prediction scheme control unit 680 controls a predictive decoding processing method on a per-picture basis according to metadata regarding predictive coding such as motion information generated by the entropy coding processing unit 612.

Special playback processing according to the present embodiment will now be described with reference to FIG. 4. In this description, playback processing at six times normal speed using coded data generated in the above-mentioned coding processing will be provided as an example of special playback.

Coded data input from the data input unit 610 is entropy-decoded at the entropy decoding processing unit 612, and separated into image data and metadata multiplexed on the coded data. Metadata is data indicating motion information or information regarding a coding scheme. When performing playback processing at six times normal speed, metadata is referenced to decode only image data of I-pictures or reference-limited P-pictures.

First, inverse quantization at a predetermined quantization scale is performed on entropy-decoded digital data by the inverse quantization unit 614, and an integer transform coefficient is generated. Image data is restored by performing an inverse integer orthogonal transform on the integer transform coefficient in the inverse transform unit 616. Predictive image data, which will be described later, is added to the restored image data by the adder 618 to generate image data, which is the end result of decoding. The decoded image data is output from an output unit 620.

In addition, the decoded image data is sent to a switch unit 635 as reference image data used in subsequent decoding processing. On the other hand, a metadata regarding predictive coding scheme generated by the entropy decoding processing unit 612 is sent to the prediction scheme control unit 680. The prediction scheme control unit 680 controls the switch unit 635 via a control input unit 611 based on whether a special playback instruction has been received from the system control unit 20 and on metadata.

In other words, when a special playback instruction (in this case, an instruction for playback at six times normal speed) has been issued, an I-picture or a reference-limited P-picture is selected by referencing metadata. In the case of an I-picture, switches 635c and 635a are connected to each other, while in the case of a reference-limited P-picture, switches 635c and 635b are connected to each other. As a result, a decoded image of an I-picture is stored in the third frame memory 636. The intra-predictive decoding unit 640 generates predictive image data on which intra-predictive decoding has been performed from peripheral decoded image data, and sends the generated data to the switch unit 660. In the case of an I-picture, switches 635c and 635a are connected to each other according to an instruction from the prediction scheme control unit 680, and predictive image data is sent to the adder 618.

On the other hand, in the case of a reference-limited P-picture, block boundary correction is performed by the deblocking filter unit 650 on the decoded image data, which is subsequently retained in the fourth frame memory 652. The retained image data is retained as a reference picture for another reference-limited P-picture, and is used by the inter-predictive decoding unit 656 in combination with metadata regarding predictive coding generated by the entropy decoding processing unit 612 in order to generate predictive image data. Predictive image data is sent to the switch unit 660. At the switch unit 660, switches 660b and 660c are connected to each other by the prediction scheme control unit 680. The predictive image data is then sent to the adder 618 to be used in image data decoding processing.

As seen, according to the present embodiment, in a case where a special playback instruction is issued, the decoding processing unit 600 is now able to decode only an I-picture or a reference-limited P-picture, thereby enabling special playback to be performed smoothly.

In addition, by arranging an I-picture or a reference-limited P-picture to be coded for each predetermined number of pictures and also to be included in regular intervals, special playback at a predetermined speed may be easily achieved.

For the present embodiment, while a case of achieving playback at six times normal speed has been described as an example of special playback, it is needless to say that fast playback at speeds such as 12 times normal speed, 18 times normal speed and 24 times normal speed may be achieved by further culling decoded pictures. In addition, it may be easily understood that playback at two to five times normal speed (as well as double speeds thereof) may be achieved by increasing the frequency of occurrence of I-pictures and reference-limited P-pictures and performing coding accordingly. Furthermore, a conventional special playback method in which only I-pictures are extracted for playback may also be used.

Moreover, in the present embodiment, since the frequency of occurrence of a picture for special playback may be set independent of the number of pictures that constitute a GOP, the frequency of occurrence of a picture for special playback may be set in a flexible manner.

Furthermore, in the present embodiment, since pictures for special playback are realized primarily using P-pictures which have a higher coding efficiency compared to I-pictures, special playback may easily be realized while suppressing a decline in coding efficiency.

In the present embodiments, P-pictures which reference I-pictures or other reference-limited P-pictures applied thereon in the same GOP are used as P-pictures for special playback. However, pictures of other coding schemes may be used instead as long as such reference relationships hold true. For instance, a random accessible interframe coding predictive picture with a reference picture relationship that is contained within a predetermined number of pictures may be used as a picture for special playback.

Second Embodiment

Next, a second embodiment of the present invention will be described.

Since the present embodiment is also applicable to the video camera described with respect to the first embodiment, contents already described with respect thereto will be omitted.

Figure 7:
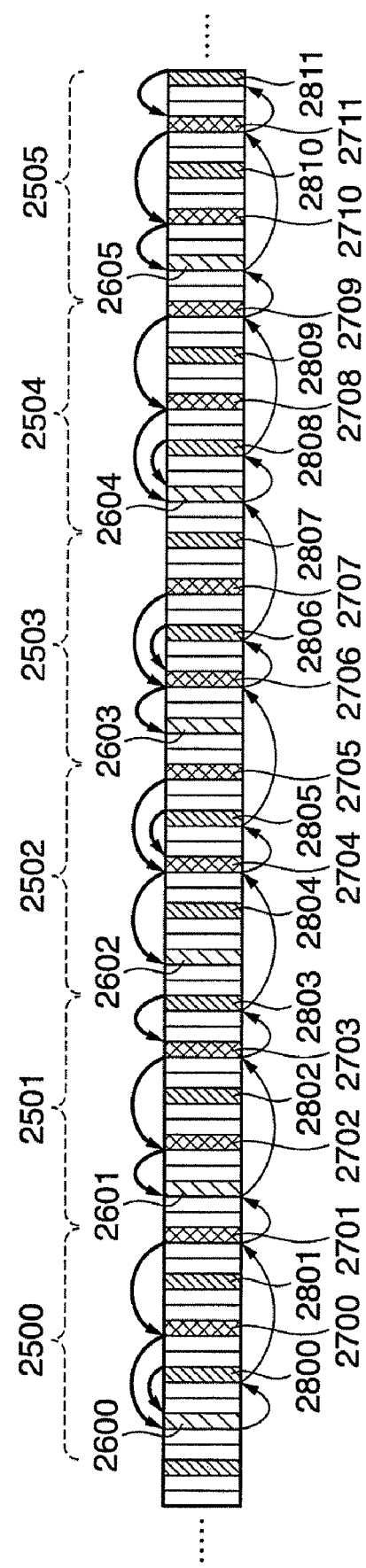
FIG. 7 is a diagram describing a method for selecting a coding prediction scheme according to a second embodiment of the present invention.

FIG. 7 is a diagram showing an example of coding scheme selection performed by a video camera according to the present embodiment. In FIG. 7, reference numerals 2500 to 2505 denote groups of pictures that are managed as GOPs, reference numerals 2600 to 2605 denote I-pictures, and reference numerals 2700 to 2711 and 2800 to 2811 respectively denote P-pictures.

In this case, the P-pictures 2800 and 2700 reference the I-picture 2500 in the same GOP 2500. Next, the P-picture 2701 references the P-picture 2700 in the same GOP 2500, while the P-picture 2702 references the P-picture 2601 in the same GOP 2501. Furthermore, the P-picture 2703 references the P-picture 2702 in the same GOP 2501, the P-picture 2803 references the P-picture 2703 in the same GOP 2501, and the I-picture 2602 is three pictures behind the P-picture 2703.

In addition, the P-picture 2704 references the I-picture 2602 in the same GOP 2502, while the P-pictures 2805 and 2705 reference the P-picture 2704 in the same GOP 2502.

Furthermore, the P-picture 2706 references the I-picture 2603 in the same GOP 2503, while the P-pictures 2806 and 2707 reference the P-picture 2706 in the same GOP 2503. Thereafter, reference relationships of the P-pictures 2808, 2708, 2709, 2710, 2711 and 2811 are limited in a similar pattern.

In the present embodiment, reference limitations applied to the P-pictures 2700 to 2711 are the same as those in the first embodiment. If these reference limitations may be considered as being representative of a first limited coding scheme, the new limitations applied to the P-pictures 2800, 2803, 2805, 2806, 2808 and 2811 represent a second limited coding scheme.

According to the present embodiment, the I-pictures 2600, 2602 and 2604 and the P-pictures 2700 to 2711 are arranged in regular six picture intervals (every sixth picture). In order to decode these pictures, all that is required in addition to decoding of the pictures themselves is decoding of I-pictures 2601, 2603 and 2605.

Therefore, all extracted pictures may be decoded by extracting I-pictures as well as P-pictures to which the first limited coding scheme has been applied. As a result, since all pictures will be decodable every six pictures, playback display at six times normal speed may be realized by displaying the decoding results at a normal frame rate. This is the same as in the first embodiment.

In the present embodiment, in addition to the P-pictures on which the first limited coding scheme has been applied (first-limited P-pictures), the second limited coding scheme is applied to the P-pictures 2800, 2803, 2805, 2806, 2808 and 2811.

The P-pictures on which the second limited coding scheme has been applied (second-limited P-pictures) are also arranged so that reference is limited to I-pictures or first-limited P-pictures in the same GOP. As a result, reference relationships are contained exclusively within I-pictures as well as P-pictures with first and second limitations. In other words, decoding may be performed independent of other picture groups.

Special playback at ten times normal speed or higher will now be considered. For instance, when considering playback at 12 times normal speed, which is twice as fast as six times normal speed, the simplest realization method would involve performing normal rate playback display of every other I-picture or every other first-limited P-picture included every six pictures, in other words, one image data per every 12 pictures.

However, pictures placed every 12th picture may not have a high correlation. In this case, a user may get an unnatural impression similar to that received from a display of frame-dropped moving pictures or a list display of still images. In this light, the present embodiment is arranged so that pictures having a strong correlation with a displayed picture for special playback is additionally displayed between pictures for special playback which are displayed at every 12th picture. As a result, visual unnaturalness may be suppressed, and an impression of smooth switching between pictures resembling a moving picture may be created.

In the present embodiment, the above-described improvement of visual characteristics during fast playback may be achieved by providing second-limited P-pictures in addition to pictures for special playback for which reference pictures have been limited (hereinafter referred to as first-limited P-pictures), which have been described with respect to the first embodiment.

More specifically, in the case of fast playback in excess of a predetermined playback speed (in this description, 12 times normal speed or higher), playback and display will be sequentially performed on, for instance, the following pictures.

Decoding processing: I-picture 2600,
decoding processing: second-limited P-picture 2800,
decoding processing: first-limited P-picture 2701,
decoding processing: I-picture 2601,
decoding processing: first-limited P-picture 2703,
decoding processing: second-limited P-picture 2803,
decoding processing: first-limited P-picture 2704,
decoding processing: second-limited P-picture 2805,
decoding processing: first-limited P-picture 2706,
decoding processing: second-limited P-picture 2806,
decoding processing: I-picture 2604,
decoding processing: second-limited P-picture 2808,
decoding processing: first-limited P-picture 2709,
decoding processing: I-picture 2605,
decoding processing: first-limited P-picture 2711,
decoding processing: second-limited P-picture 2811, In this example, for every other picture for special playback (2600, 2701, 2703, 2704, 2706, 2604, 2709, 2711) displayed at every 12th picture, pictures that are three pictures behind (2800, 2601, 2803, 2805, 2806, 2808, 2605, 2811) are additionally displayed as pictures with strong correlations with the pictures for special playback.

As a result, visual unnaturalness due to low correlation between pictures placed 12 pictures apart may be suppressed, and a smooth, moving picture-like display may be performed. Since the number of displayed pictures are increased in this manner, a picture update speed of playback at six times normal speed is realized even though display is performed on every 12th picture. However, since the focus of the present embodiment lies in achieving visual improvement during fast search of pictures with low correlations, the numerical value of 12 times normal speed is insignificant in itself. In other words, if the search speed of fast pictures with low correlations is 24 times normal speed, the actual update speed is reduced in correspondence to the number of inserted pictures to 12 times normal speed. Nevertheless, this does not mean that perceived search speed will be reduced by half, and thanks to improvement in visual characteristics, a practical fast playback may be provided. Since an example of 12 times normal speed has been described with respect to the present embodiment for the sake of simplicity, the description may not differ from that of a screen update rate of six times normal speed. However, given the purpose of the present description of ensuring that contents herein are easily understood, it should be understood that such details are not particularly significant from a practical perspective. In the unlikely event that a user feels discomfort from the fact that display time remains unchanged even when shifting from search at six times normal speed to search at 12 times normal speed, the next fast search speed after six times normal speed should be set at 24 times normal speed. In addition, this sense of discomfort may be relieved by displaying only one of the fields of pictures extracted at 12 times normal speed and updating frames at 1/60 seconds, As seen, two limited coding schemes are used in the present embodiment. The first limited coding scheme limits referencing by a forward predictive picture (P-picture) to be used in fast playback to an I-picture or another P-picture to which the first limited coding scheme has been applied in the same GOP. In addition, the second limited coding scheme limits referencing by a forward predictive picture having a high correlation with a picture to be used in fast playback to an I-picture or another P-picture to which the first limited coding scheme has been applied in the same GOP.

The present embodiment has been arranged so that the second limited coding scheme is applied to an I-picture or a P-picture which appears next to the picture to be used for fast playback. In a case where I, P and B-pictures are arranged as shown in FIG. 7, the second limited coding scheme will be applied to the picture that is three pictures behind the picture to be used for fast playback.

As a result, decoding of pictures composed of I-pictures and first and second-limited P-pictures may be achieved using coded data of I-pictures or first and second-limited P-pictures in the same GOP.

Figure 8A:
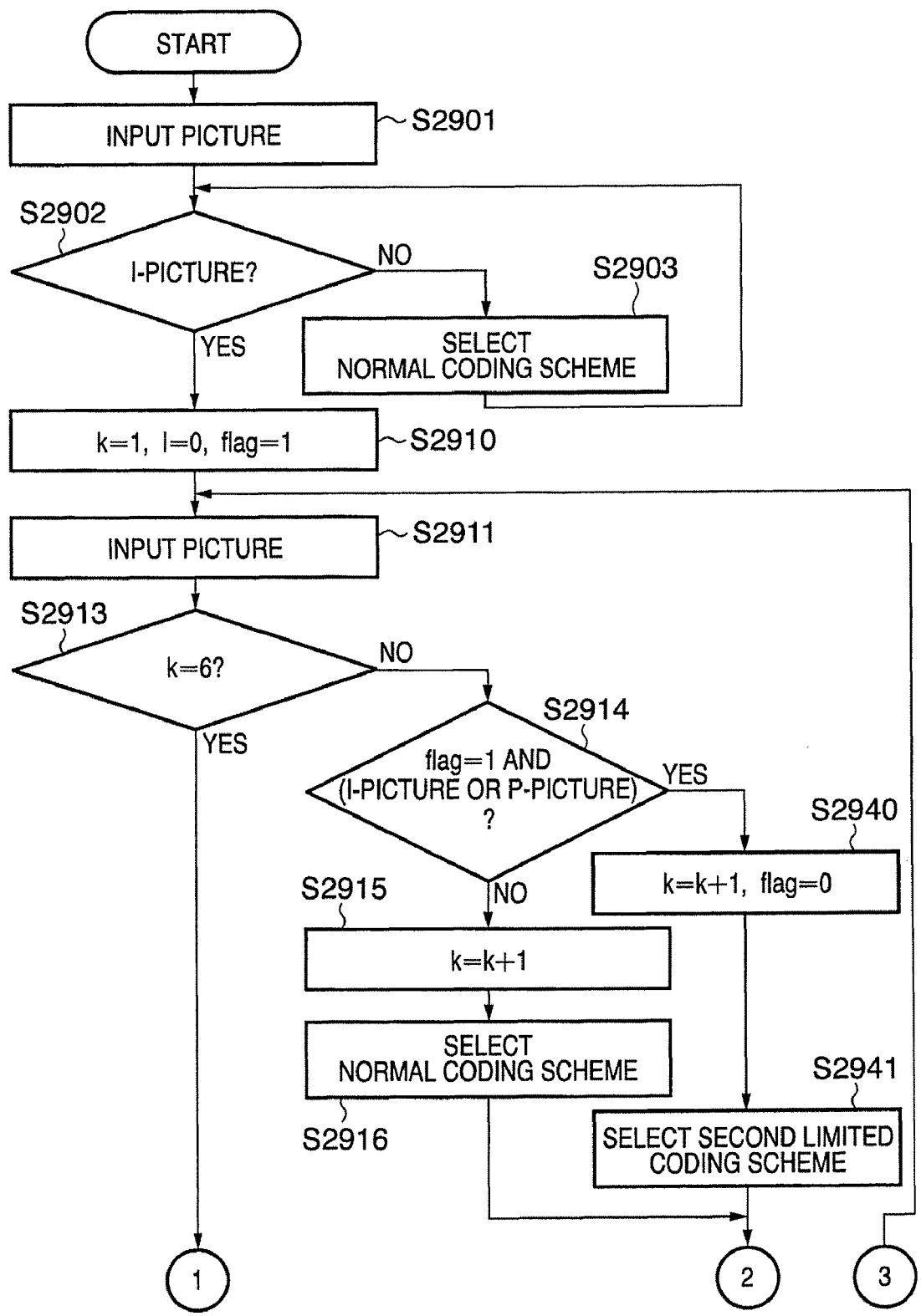
FIGS. 8A and 8B are flowcharts describing an operation for coding scheme selection by a coding processing unit according to the first embodiment of the present invention.
Figure 8B:
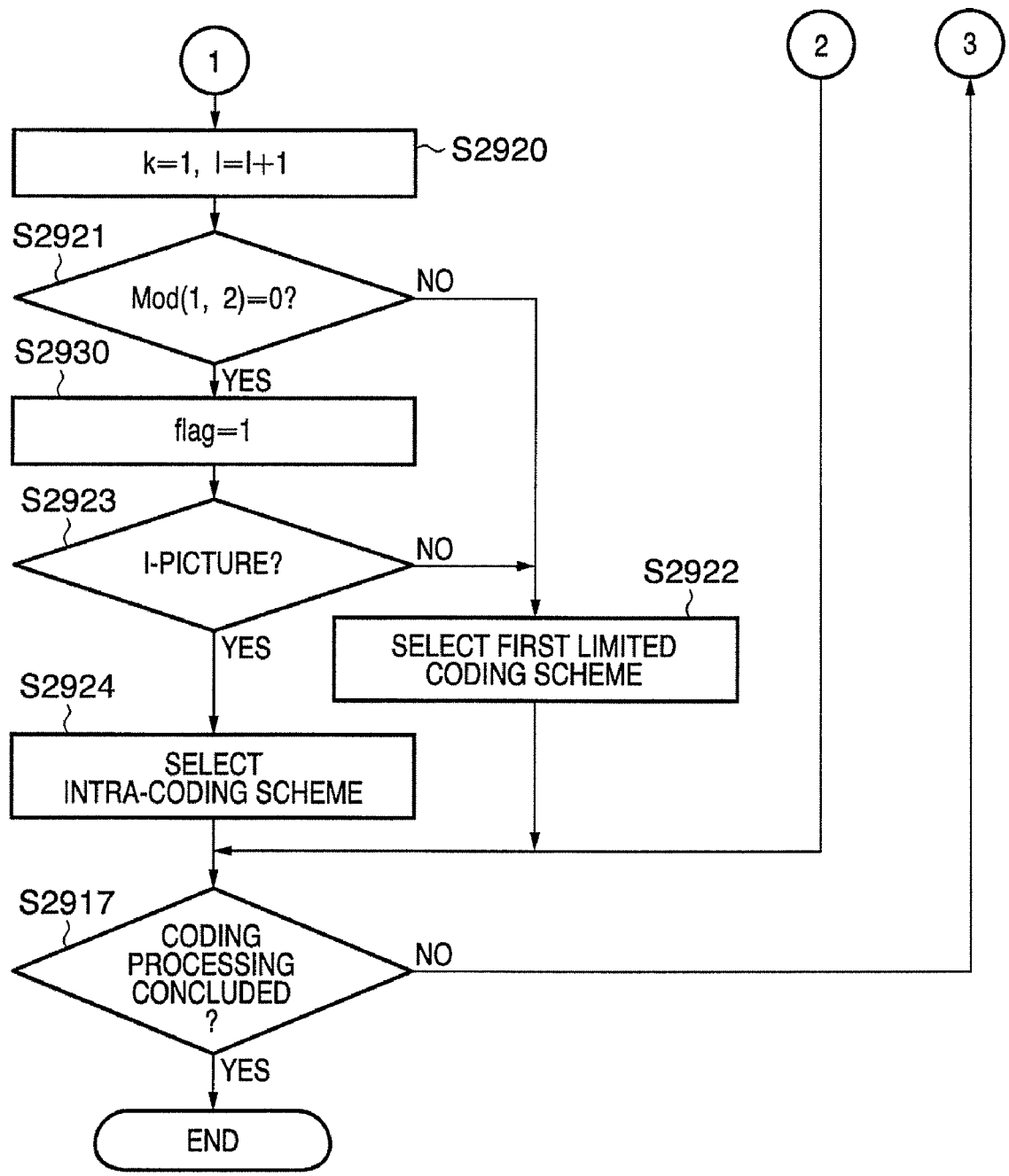

Next, operations for selecting a coding scheme performed by the coding processing unit 200 according to the present embodiment will be described with reference to the flowchart shown in FIGS. 8A and 8B.

First, upon coding, selection of a coding scheme for each picture is commenced. When a coding object picture is input (S2901), the coding processing unit 200 determines, using a predetermined method, whether the intraframe coding scheme should be used for the input picture (S2902). If the intraframe coding scheme is not applied, the coding processing unit 200 selects a normal method performed according to the H.264 scheme as the coding scheme (S2903). Generally, the bidirectional predictive coding scheme is selected and determined for the first two input pictures.

On the other hand, if it is determined that the intraframe coding scheme will be applied to the input picture (S2902), the coding processing unit 200 initializes a first counter k to 1, a second counter l to 0, a second limited coding flag to 1, and performs intraframe coding processing on the input picture (S2910).

When the next picture is input (S2911), the coding processing unit 200 determines whether the first counter value k is 6 (S2913). If not k=6, the coding processing unit 200 determines whether the second limited coding flag is 1 and whether the picture is an I-picture or a P-picture (S2914). Normally, since an I-picture is followed by a B-picture, this condition is not satisfied. Therefore, the coding processing unit 200 increments the first counter value k by 1 (S2915), and a coding scheme is selected by a normally performed predetermined method (S2916).

After performing coding processing using the selected coding scheme, the coding processing unit 200 determines whether an instruction for terminating coding processing has been issued (S2917). If a termination instruction has not been issued, pictures will be continuously input to the coding processing unit 200 (S2911). If a termination instruction has been issued, the coding processing unit 200 terminates coding processing as well as selection of coding schemes (S2950).

During processing of a next input picture, when the first counter k is not 6 (S2913), the second limited coding flag is 1 and the picture is either an I-picture or a P-picture (Yes in S2914), the coding processing unit 200 advances processing to S2940. For instance, when a P-picture following two B-pictures is input, the following processing is performed. First, the coding processing unit 200 increments the first counter value k by 1, and resets the second limited coding flag to 0 (S2940). The coding processing unit 200 next selects the second limited coding scheme (S2941).

As a result, for every other picture arranged at regular intervals (in this example, every six pictures) for which the first limited coding scheme has been selected, the second limited coding scheme will be selected for a nearest P-picture or I-picture. In the case of an I-picture, note that special processing will not be performed even when the second limited coding scheme is selected, and ordinary intra-predictive coding will be performed. On the other hand, in the case of a P-picture, inter-predictive coding will be performed in which referencing is limited to an I-picture or a first-limited P-picture in the same GOP. For P-pictures, the fact that the pictures are second-limited pictures is managed as metadata to be superimposed on a stream.

When the first counter K is 6 (S2913), the coding processing unit 200 first resets the first counter k to 1, and increments the second counter l by 1 (S2920). Next, the coding processing unit 200 determines whether the remainder of a modulo operation of the second counter value l by 2 is 0 (S2921). If so, the coding processing unit 200 sets the second limited coding flag to 1 (S2930). As a result, for first-limited pictures (P-pictures or I-pictures) arranged at regular intervals, a flag that sets a second-limited picture is set for every other picture. After this processing (S2930) or when the remainder of a modulo operation of the second counter value l by 2 is 1 (S2921), the coding processing unit 200 determines whether the input picture is to be an I-picture or not in the same manner as in S2902 (S2923). When it is determined that the input picture is to be an I-picture, the coding processing unit 200 selects the intraframe coding scheme (S2924), and proceeds to S2917.

When it is determined in S2923 that the input picture is not to be an I-picture, the coding processing unit 200 selects the first limited coding scheme (S2922). In other words, as described with reference to FIG. 6, the forward predictive coding scheme is selected in which an I-picture or a P-picture coded under a similar reference limitation (limited P-picture) within the same GOP is used as a reference picture. For coded image data coded under the first limited coding scheme, the fact that the pictures have been subject to the first limited coding scheme is managed as metadata to be superimposed on a stream.

Since playback of a coded data stream generated in the present embodiment may be performed by basically the same procedures as used in the first embodiment described with reference to FIG. 4, a description thereof will be omitted. The present embodiment differs from the first embodiment in that pictures for decoding and display are switched according to a playback speed included in a fast playback instruction input from the control input unit 611.

In other words, in the present embodiment, when an instruction for playback at six times normal speed is issued from the control input unit 611, fast playback and display processing as described with respect to the first embodiment will be performed. On the other hand, if an instruction for a fast playback (in this case, playback at 12 times normal speed) which equals or exceeds a predetermined speed has been issued, based on metadata generated by the entropy decoding processing unit 612, second-limited P-pictures will be included in decoding objects in addition to I-pictures and first-limited P-pictures. Next, as described with reference to FIG. 7, pictures at regular 12 picture intervals and second-limited pictures will be displayed.

In the second embodiment, second-limited pictures are used to suppress a decline in visual characteristics due to reduced correlations between displayed images caused by an increase in the display intervals of pictures during fast playback. In the above description, playback of second-limited pictures is not performed during playback at six times normal speed, but is performed during playback at 12 times normal speed. However, playback speed may be arbitrarily set.

Additionally, in the description of the present embodiment, pictures to which the second limited coding scheme are applied have been limited to P-pictures. However, similar effects may be gained by limiting pictures referenced by B-pictures sandwiched between first-limited pictures to first-limited pictures in the same GOP.

Furthermore, in the present embodiment, since the frequency of occurrence of pictures for special playback may be set independent of the number of pictures that constitute a GOP, the frequency of occurrence of pictures for special playback may be set in a flexible manner.

Moreover, in the present embodiment, since pictures for special playback are realized primarily using P-pictures which have a higher coding efficiency compared to I-pictures, special playback may easily be realized while suppressing a decline in coding efficiency.

In the present embodiment, P-pictures which reference I-pictures or other reference-limited P-pictures applied thereon in the same GOP are used as P-pictures for special playback in the same manner as in the first embodiment. However, pictures of other coding schemes may be used instead as long as such reference relationships hold true. For instance, a random accessible interframe coding predictive picture with a reference picture relationship that is contained within a predetermined number of pictures may be used as a picture for special playback.

Third Embodiment

Next, a third embodiment of the present invention will be described.

Since the present embodiment is similarly applicable to the video camera described with respect to the first embodiment, contents already described with respect thereto will be omitted.

As described with reference to FIG. 5, limitations imposed by the H.264 scheme on the reference pictures of P-pictures are extremely lax. Allowing such unrestricted referencing has adverse effects during special playback and in particular, during fast playback as described above in that a user will be forced to use a playback method in which only I-pictures are extracted. In other words, while a single GOP is composed by 15 pictures in the example shown in FIG. 5, the number of pictures constituting a GOP is not fixed. For instance, there are cases where a GOP is configured by an even greater number of pictures (e.g. 30) in order to realize coding having greater efficiency. When performing fast playback by extracting I-pictures in a GOP, changes in the number of pictures composing the GOP causes changes in playback speed. A video camera as an example of an image encoding apparatus as well as an image decoding apparatus according to the present embodiment suppresses changes in playback speed during fast playback as described below even when the number of pictures constituting a GOP is altered.

A principle of selection of a coding prediction scheme by a picture control unit 280 of a video camera according to the present embodiment will now be described with reference to FIG. 10.

Figure 10:
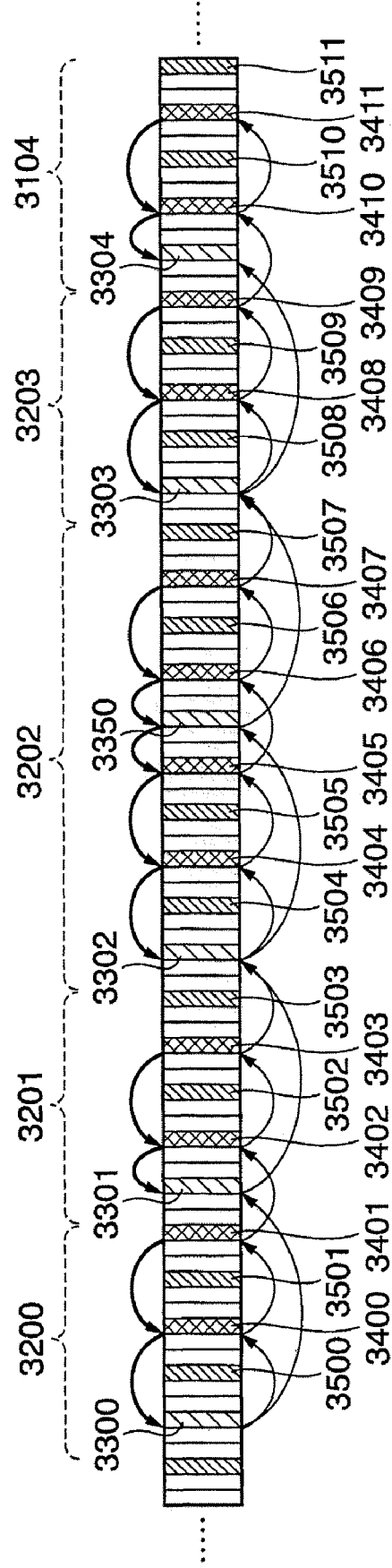
FIG. 10 is a diagram describing a method for selecting a coding prediction scheme according to the third embodiment of the present invention.

In FIG. 10, reference numerals 3200 to 3204 denote GOPs, reference numerals 3300 to 3304 denote I-pictures, and reference numerals 3350, 3400 to 3411 and 3500 to 3511 respectively denote P-pictures. Additionally, in FIG. 10, the GOPs 3200, 3201, 3203 and 3204 are respectively composed of 15 pictures, while the GOP 3202 is composed of 30 pictures.

The P-picture 3400 references an I-picture 3300 in the same GOP 3200, while the F-picture 3401 references the P-picture 3400 in the same GOP 3200. The P-picture 3402 references the I-picture 3301 in the same GOP 3201, while the P-picture 3403 references the P-picture 3402 in the same GOP 3201. The P-picture 3404 references the I-picture 3302 in the same GOP 3202, while the P-picture 3405 references the P-picture 3404 in the same GOP 3202.

The P-picture 3350 references the P-picture 3405 in the same GOP 3202. The next P-picture 3406 references the P-picture 3350 in the same GOP 3202, while the P-picture 3407 references the P-picture 3406 in the same GOP 3202. Subsequently, the P-pictures 3408, 3409, 3410 and 3411 of the GOPs 3203 and 3204 have the same reference relationships as the GOPs 3200 and 3201.

The preference pictures for the respective GOPs 3200 to 3204 are the I-pictures 3300 to 3304. However, unlike other GOPs in which I-pictures occur every 15 pictures, the I-picture 3303 is the 30th picture after the previous I-picture 3302. This is due to the fact that the GOP 3202 has been replaced with a 30-picture configuration in consideration to coding efficiency. In other words, unless the number of GOP-constituent pictures GOP is changed, the coded picture that was originally intended to be an I-picture will be replaced with the P-picture 3350.

In consideration thereof, for I-pictures and P-pictures arranged per a minimum number of pictures composing the GOP, the present embodiment manages I-pictures 3300 to 3304 and the P-picture 3350 as first-limited coded pictures. In other words, for a first-limited coded picture, when the GOP which includes the picture is composed of a minimum number of pictures, coding is performed using the intraframe predictive coding scheme. For a first-limited coded picture included in a GOP that is composed of a larger number of pictures, referencing is limited to pictures that are decodable only from coded data from a nearest first-limited coded picture to an immediately-preceding coded picture. Hereinafter, the above-described reference-limited coding scheme shall be referred to as the first limited coding scheme.

More specifically, in the example shown in FIG. 10, the minimum number of pictures constituting a GOP is 15. The I-picture 3300 is the third picture of the GOP 3200. The following pictures which respectively are 15×nth (where n denotes a natural number) pictures from the I-picture 3300 configure a group of first-limited coded pictures.

I-picture 3300
I-picture 3301
I-picture 3302
P-picture 3350
I-picture 3303
I-picture 3304

Since the GOP 3202 is composed of more pictures than a minimum number of constituents, the 15th picture from the I-picture 3320 is the P-picture 3350.

In this case, pictures that may be referenced by the P-picture 3350 which will perform interframe predictive coding will be limited to pictures that are decodable only from coded data from I-picture 3302, which is the nearest coded picture with a first limitation, to the B-picture 3340, which is the immediately-preceding picture. Therefore, the P-picture 3350 will be coded using the interframe coding scheme which uses one or more of the I-picture 3302 and the P-pictures 3404 and 3405 as reference pictures. In the example shown in FIG. 10, the P-picture 3350 references the P-picture 3405.

Furthermore, in the present embodiment, using a coded picture with a first limitation as the reference picture, second-limited coded pictures will be provided per a predetermined number of pictures (6 in this example) that is smaller than the minimum number of pictures composing the GOP. More specifically, P-pictures which reference first-limited coded pictures included in the same GOP or other pictures for special playback included in the same GOP are provided as second-limited coded pictures.

In FIG. 10, the second-limited coded pictures are the P-pictures 3400 to 3411 which exist every six pictures from the I-picture 3300. As seen, a group of pictures that are provided every six pictures starting at the I-picture 3300 is arranged independently of changes in the number of pictures composing the GOP. In addition, all of the pictures in these picture groups are decodable as long as the group of first-limited coded pictures is decoded. This means that, by extracting the first-limited coded pictures and the second-limited coded pictures, pictures provided every six pictures are always decodable regardless of the number of pictures composing the GOP. Therefore, by displaying the pictures provided every six pictures at a normal frame rate, playback display maintaining six times normal speed may be realized even if the number of pictures composing the GOP is altered.

Figure 9A:
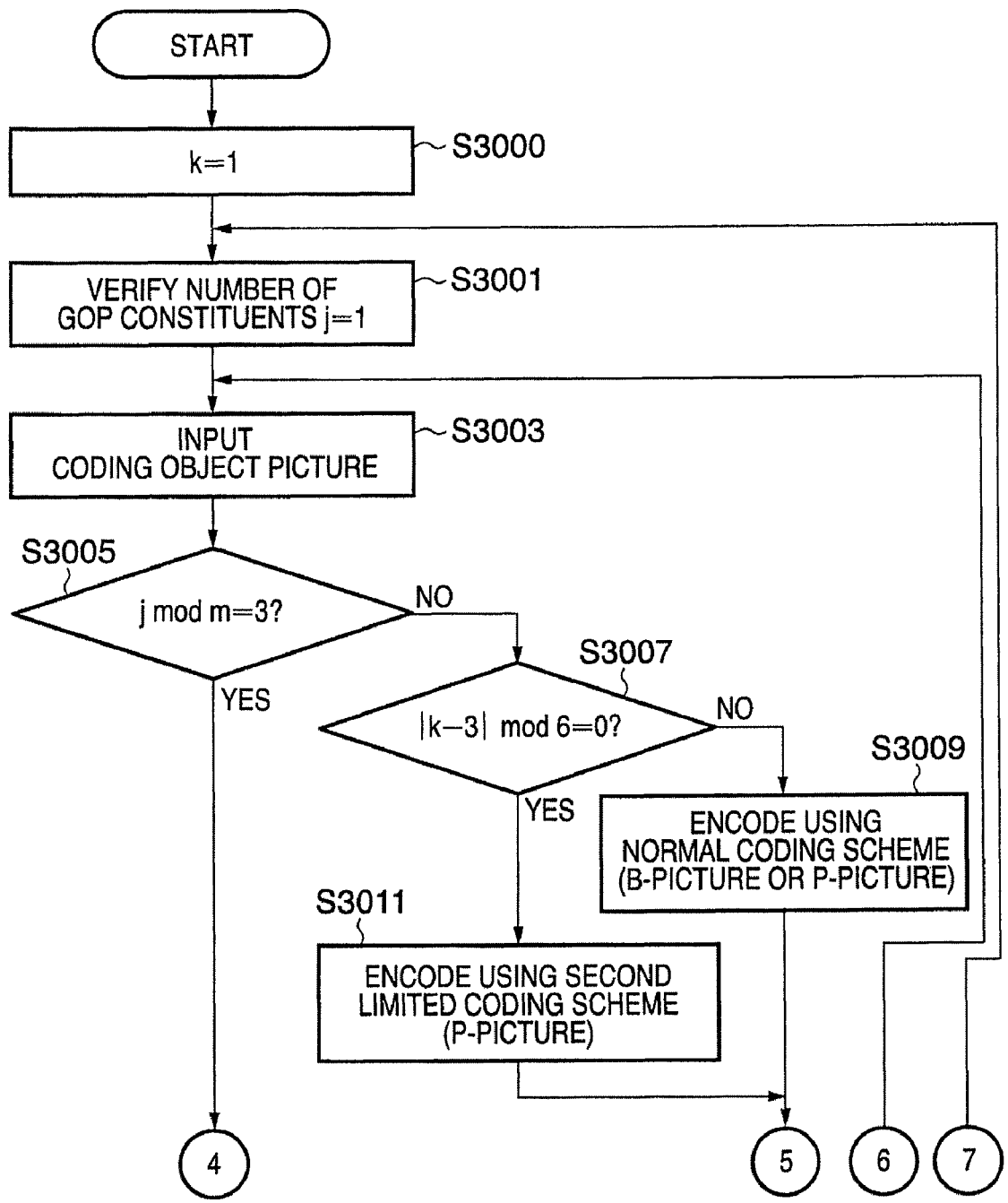
FIGS. 9A and 9B are flowcharts describing a coding processing operation by a coding processing unit according to a third embodiment of the present invention.
Figure 9B:
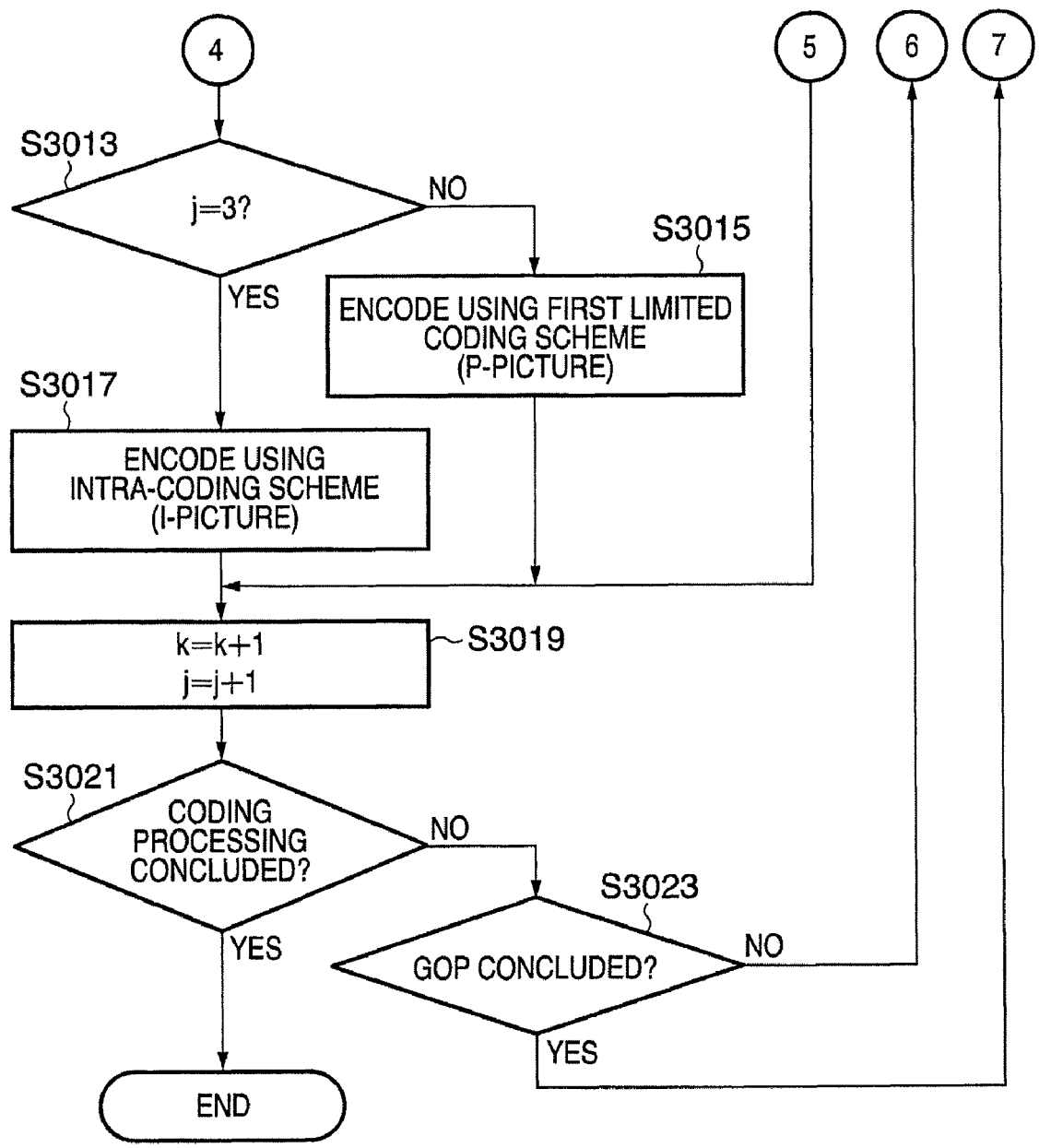

Next, coding operations performed by the coding processing unit 200 according to the present embodiment will be described with reference to the flowchart shown in FIGS. 9A and 9B.

Upon commencement of coding processing of image data, the coding processing unit 200 first resets the value k of a coding object picture counter to 1 (S3000). The coding processing unit 200 verifies the number of pictures constituting the GOP (number of GOP constituents), and resets the value j of a GOP internal picture counter to 1 (S3001).

Figure 11:
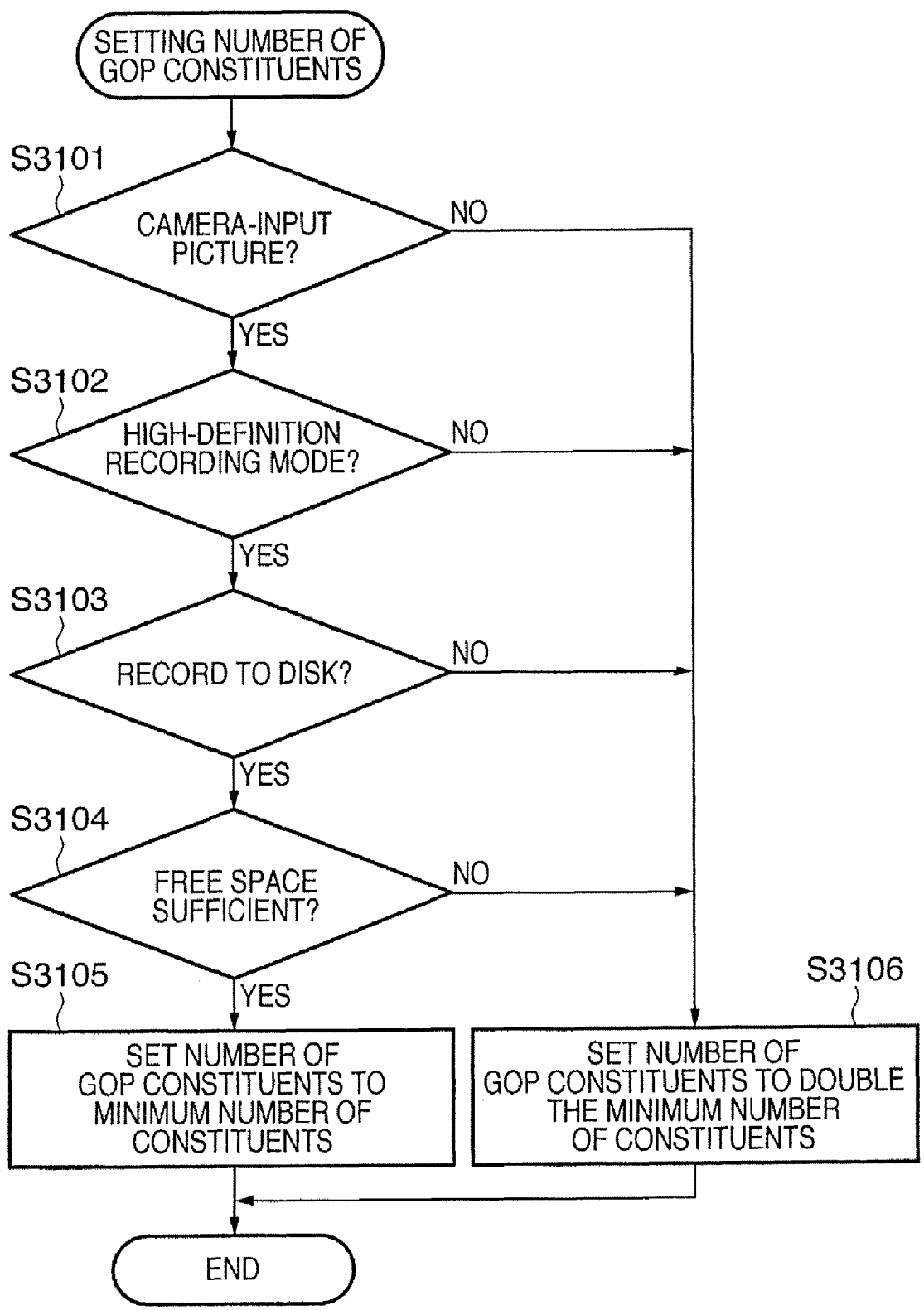
FIG. 11 is a flowchart describing details of processing for confirming a number of GOP-constituent pictures performed in S3001 shown in FIG. 9A.

Next, a method of setting a number of GOP constituents according to the present embodiment will be described with reference to the flowchart shown in FIG. 11. When setting of a number of GOP constituents is commenced, the system control unit 20 first verifies whether the image data to be coded (coding object picture) will be input from the camera (S3101). With the video camera according to the present embodiment, a coding object picture is provided as either a camera input (input from the image input unit 100) or a line input (input from an external input terminal such as a USB or an IEEE 1394).

When it is determined in S3101 that the coding object picture will be line-input, the system control unit 20 advances the processing to S3106. On the other hand, if it is determined that the coding object picture will be camera-input, the system control unit 20 determines whether the recording mode is set to high definition recording mode (S3102).

Recording modes available in the present embodiment are a high definition recording mode which uses a high data rate and emphasizes image quality, and an extended recording mode which uses a data rate that is lower than that of the high definition recording mode but enables longer recording in comparison therewith. When the extended recording mode is set, the system control unit 20 advances the processing to S3106.

On the other hand, when the high definition recording mode is set, the system control unit 20 determines whether the recording medium is a disk (S3103). For the present embodiment, recording media usable as recording locations include disks (DVD-R and the like) that are suitable for large capacity recording, and memory cards that are easy to handle but are not suitable for large capacity recording. If the recording medium is a memory card, the system control unit 20 advances the processing to S3106. If recording is to be performed on a disk, the system control unit 20 verifies free space on the recording medium (S3104). If the free space does not equal or exceed a predetermined value, the system control unit 20 advances the processing to S3106. On the other hand, if the free space on the recording medium equals or exceeds a predetermined value, the system control unit 20 advances the processing to S3105. In S3105, the system control unit 20 sets the number of GOP constituents to a minimum number of constituents m (in this example, 15). On the other hand, in S3106, the system control unit 20 sets the number of GOP constituents to double the minimum number of constituents, which, in this example, is 30.

Generally, the greater the number of GOP constituents, the less the number of I-pictures with high code volumes. As a result, coding efficiency is enhanced. Since line-input images are often relatively stable and tend to possess high correlations between pictures, high efficiency coding may be realized by increasing the number of GOP constituents. In addition, with the extended recording mode, improved coding efficiency as a result of a reduced frequency of occurrence of I-pictures enables achievement of further extended recording. Furthermore, since memory cards have a high per-capacity price, the number of GOP constituents are increased in order to efficiently use capacity. Moreover, even with disk recording media, the number of GOP constituents are increased when free space is insufficient.

According to the above procedure, a number of GOP constituents is set by the system control unit 20 shown in FIG. 2 and sent to the coding processing unit 200, whereby setting of the number of GOP constituents is concluded (S3107).

Returning now to FIG. 9A, the coding processing unit 200 verifies the number of GOP constituents set according to the above-described procedure, resets the GOP internal counter (S3001), and proceeds to S3003 to input a coding object picture. Next, the coding processing unit 200 checks whether a remainder (j mod m) of a modulo operation of the GOP internal counter value j when the minimum number of GOP constituents m is the modulus, is 3 (S3005).

If the value of j mod m is not 3, the coding processing unit 200 advances the processing to S3007, and checks whether a remainder (|k−3| mod 6) of a module operation of the coding object picture counter value k and a modulus of 6 is 0. In the present embodiment, the third picture of the first GOP is an I-picture, and P-pictures for special playback are provided every six pictures from the I-picture. Therefore, whether the input coding object picture should be coded as a picture for special playback is judged by this calculation.

If not |k−3| mod 6=0, the coding processing unit 200 advances processing to S3009 and performs coding processing under an ordinary coding scheme. In this case, the coding object picture is coded by either the forward predictive coding scheme or the bidirectional predictive coding scheme.

On the other hand, if |k−3| mod 6=0 in S3007, the coding processing unit 200 in S3011 codes the coding object picture according to the second limited coding scheme. The second limited coding scheme is a reference-limited forward predictive coding scheme. More specifically, a forward predictive coding scheme (inter-predictive coding scheme) is used which uses a temporally-preceding I-picture or another picture in a picture stream which is coded according to the second limited coding scheme. Therefore, a picture group composed of I-pictures and P-pictures coded using the second limited coding scheme (second-limited pictures) may be decoded using only data from within the picture group. As a result, coded data generated according to the present embodiment includes decodable pictures at every six pictures, and display at six times normal speed may be easily performed.

In S3005, when j mod m=3, the coding processing unit 200 advances processing to S3013 and verifies the GOP internal counter value j. The coding processing unit 200 further verifies whether j=3 (S3013). If j=3 or, in other words, if the coding object picture is the third picture of the GOP, the picture is an I-picture according to the present embodiment. Therefore, when j=3, the coding processing unit 200 performs coding in S3017 according to the intraframe coding scheme.

On the other hand, if not j=3, the coding object picture is a (3+m*n)th picture (where n is a natural number) in the GOP, such as the picture 3350 shown in FIG. 10. Therefore, the coding processing unit 200 performs coding using the above-described first limited coding scheme (S3015).

In this manner, each input coding object picture is coded in any of S3009, S3011, S3017 or S3015. Information regarding the coding scheme used is multiplexed onto coded data of each picture by the entropy coding unit 218.

In S3019, the coding processing unit 200 respectively increments the values of the GOP internal counter j and the coding object picture counter k by 1. In S3021, the coding processing unit 200 verifies whether coding processing will be continued, and if not, concludes processing. If processing is not concluded, in step S3023, the coding processing unit 200 checks whether GOP has been concluded. More specifically, this judgment may be performed using the number of GOP constituents verified in S3001 and the value of the GOP internal counter j.

If the value of j is equal to or less than the number of GOP constituents, the GOP has not been concluded. Therefore, the coding processing unit 200 returns processing to S3003 and inputs the next coding object picture. In addition, a value of j exceeding the number of GOP constituents means that the coded picture is the last picture in the GOP. Therefore, the coding processing unit 200 judges that the GOP has been concluded and returns processing to S3001, and verifies the number of GOP constituents of the next GOP and resets the GOP internal counter.

In this manner, by including a first-limited picture to a group of coding object pictures to be input, the present embodiment is capable of suppressing changes in playback speed during fast playback even when the number of GOP constituents is altered. Furthermore, by including second-limited pictures, coded data that enables fast playback to be easily performed may be generated using interframe coding which has a higher coding efficiency than intraframe coding.

Since playback of a coded data stream generated in the present embodiment may be performed by basically the same procedures as the first embodiment described with reference to FIG. 4, a description thereof will be omitted.

As seen, according to the present embodiment, in a case where a special playback instruction is issued, the decoding processing unit 600 is now able to decode only an I-picture or a second-limited pictures, thereby enabling special playback to be performed smoothly.

In addition, by arranging an I-picture or a second-limited pictures to be coded for every predetermined number of pictures and to be included in regular intervals, special playback at a predetermined speed may be easily achieved.

The above description focuses on playback processing at six times normal speed using second-limited pictures. However, by performing decoding in conjunction with first-limited pictures, fast playback corresponding to the minimum number of GOP constituents (for instance, playback at 15 times normal speed when the minimum number of GOP constituents is 15) may be performed from I-pictures and first-limited pictures included in each GOP. As described above, in the present embodiment, even when the number of GOP constituents is increased, coding is performed by including a first-limited picture for every minimum number of GOP constituents. As a result, fast playback may be easily performed at a stable playback speed even when the number of GOP constituents is altered.

Other Embodiments

For the respective embodiments presented above, a case has been described where the present invention is applied to a video camera using the inter-predictive scheme. However, the present invention may be similarly applied to other devices such as video players or video recorders which use the inter-predictive scheme. Application of the present invention enables special playback to be performed in a simple manner while suppressing reductions in coding efficiency.

The embodiments presented above may be realized by executing software with a computer (or a CPU, an MPU and the like) of a system or an apparatus.

Therefore, the computer program itself, to be supplied to the computer to enable the computer to achieve the functions and processing of the present invention, also achieves the present invention. In other words, the present invention also encompasses the computer program itself which implements the functions of the above-described embodiments.

The computer program for realizing the above-described embodiments may take any form as long as the computer program is computer-readable. For instance, the computer program may be configured as an object code, an interpreter-executable program, a script data supplied to an OS or the like. However, the computer program need not be limited to these configurations.

The computer program for realizing the above-described embodiments is supplied to the computer from a storage medium or via wired/wireless communication. Storage media for supplying the program include, for instance, a floppy disk, a hard disk, a magnetic storage medium such as a magnetic tape, an optical/magneto-optic storage medium such as an MO, a CD or a DVD, or a nonvolatile semiconductor memory, A server on a computer network may be used to supply the computer program through wired/wireless communication. In this case, a data file (program file) which may comprise the computer program that forms the present invention is stored in a server. A program file may either be an executable file or a source code.

The program file is supplied via downloading to a client computer accessing this server. In this case, the program file may be divided into a plurality of segment files to be distributed and arranged among different servers.

In other words, a server apparatus that supplies a computer program for achieving the above-described embodiments to client computers is also an implementation of the present invention.

Additionally, it is also possible to encode the computer program for achieving the above-described embodiments and store the same in storage media to be distributed to users, whereby key information for decoding is supplied to users who satisfy certain conditions in order to enable installation of the computer program on computers of the users. Key information may be supplied through, for instance, downloading from a home page via the Internet.

Furthermore, the computer program for achieving the above-described embodiments may use functions of an OS that is already running on a computer.

Moreover, a portion of the computer program for achieving the above-described embodiments may be configured by a firmware of an extension board or the like to be mounted on the computer. In addition, the computer program for achieving the above-described embodiments may be executed by a CPU provided on the extension board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-130882, filed May 9, 2006, 2006-130883, filed May 9, 2006, which are hereby incorporated by reference herein in their entirety.

What is claimed is:

1. An encoding apparatus for encoding moving picture information using either an intraframe predictive coding scheme or an interframe predictive coding scheme, the encoding apparatus comprising:
   a control unit operable to select a coding scheme to apply to each picture of a moving picture and extract a plurality of pictures from the moving picture at a predetermined interval; and
   a coding unit operable to encode each picture of the moving picture based on the coding scheme selected by the control unit, wherein
   the control unit selects:
   for a first picture included in the extracted plurality of pictures, the intraframe predictive coding scheme;
   for a second picture included in the extracted plurality of pictures, a limited interframe predictive coding scheme in which reference pictures used in an interframe prediction are limited to either an intraframe predictive coded picture or a coded picture of another picture in the extracted plurality of pictures; and
   for each picture that is not extracted by the control unit, either the intraframe predictive coding scheme or a non-limited interframe predictive coding scheme, wherein the reference pictures are not limited as the reference pictures in the limited interframe predictive coding scheme.

2. The encoding apparatus according to claim 1, further comprising:
   a management unit operable to manage the pictures of the moving picture in groups per a predetermined number of consecutive pictures, wherein when selecting the limited interframe predictive coding scheme for the second picture, the control unit limits the reference pictures to other extracted pictures which belong to the same group as the second picture.

3. The encoding apparatus according to claim 1, wherein when selecting the limited interframe predictive coding scheme for the second picture, the control unit limits the reference pictures to pictures that temporally precede the second picture.

4. The encoding apparatus according to claim 1, wherein the control unit also selects the same coding scheme as selected for an extracted picture for pictures which are temporally in the vicinity of every n-th picture among the extracted plurality of pictures, where n is a natural number.

5. The encoding apparatus according to claim 4, further comprising:
   an output unit operable to add information indicating an applied coding scheme to data coded by the coding unit and outputs the data.

6. An encoding apparatus for encoding each picture composing a moving picture using either an intraframe predictive coding scheme or an interframe predictive coding scheme, the encoding apparatus comprising:
   a determination unit operable to determine a number of pictures to be managed as a group;
   a control unit operable to select, on a per-group basis, the coding scheme to be applied to each picture; and a coding unit operable to encode each picture based on a coding scheme selected by the control unit, wherein
the control unit selects:
for each group, the intraframe predictive coding scheme for a picture existing at the same position from the top of the group, and
for each group in which the number of pictures determined by the determination unit exceeds a predetermined value, a first limited interframe predictive coding scheme for a picture corresponding to a predetermined order from a picture included in the group for which the intraframe predictive coding scheme has been selected, wherein in the first limited interframe predictive coding scheme, reference pictures used in an interframe prediction are limited to pictures that are decoded only based on a picture in the same group for which the intraframe predictive coding scheme has been selected to an immediately-preceding picture.

7. The encoding apparatus according to claim 6, wherein:
for each picture corresponding to a predetermined period, except for a picture for which the intraframe predictive coding scheme is selected, the control unit selects a second limited interframe predictive coding scheme in which reference pictures are limited to (1) pictures for which the intraframe predictive coding scheme is selected or (2) other pictures corresponding to the predetermined period; and
for pictures for which the intraframe predictive coding scheme, the control unit selects a non-limited interframe predictive coding scheme in which no limitations are placed on reference pictures, and the first and second limited interframe predictive coding schemes are not selected.

8. The encoding apparatus according to claim 6, wherein the determination unit determines the number of pictures composing the group to be either a first number or a second number that is larger than the first number based on at least one of:
(i) type of input source of the moving picture;
(ii) coding quality;
(iii) type of recording medium of coded data; and
(iv) free space of the recording medium.

9. A decoding apparatus which receives and decodes coded moving picture information, wherein
the coded moving picture information includes:
(i) coded data composed of an I picture coded using the intraframe predictive coding scheme,
(ii) a first type of P picture coded using an interframe predictive coding scheme in which reference pictures used in an interframe prediction are limited to predetermined other pictures,
(iii) a second type of P picture coded using the interframe predictive coding scheme in which no such limitations as those applied to the interframe predictive coding scheme used for coding the first type of P picture are placed on reference pictures, and
(iv) coding information indicating a coding scheme used for the coding of each picture,
the decoding apparatus comprising:
an acquisition unit operable to acquire the information indicating a coding scheme from the moving picture information;
a decoding unit operable to decode the coded data included in the moving picture information based on the coding information indicating the coding scheme acquired by the acquisition unit;
a detection unit operable to detect an execution instruction for fast playback of the moving picture information; and
a playback control unit operable to control the decoding unit to decode only the I and first type of P pictures among the coded data when the execution instruction for fast playback is detected by the detection unit, and decode the I, first type of P, and second type of P pictures when the execution instruction for fast playback is not detected by the detection unit.

10. The decoding apparatus according to claim 9, further comprising:
a display unit operable to display moving picture information obtained by the decoding unit, wherein
when the execution instruction for fast playback is detected by the detection unit, the playback control unit selects some of the I and first type of P pictures and controls the decoding unit to decode the selected pictures so that a plurality of pictures composing the moving picture information are displayed at regular intervals corresponding to the speed of the fast playback.

11. The decoding apparatus according to claim 10, wherein when the speed of the fast playback exceeds a predetermined speed, the playback control unit controls the display unit to decode, in addition to the selected I and first type of P pictures, other I or first type of P pictures which are temporally in a predetermined vicinity of the selected I and first type of P pictures.

12. An encoding method for encoding a moving picture using either an intraframe predictive coding scheme or an interframe predictive coding scheme, the encoding method comprising:
a control step for selecting a coding scheme to apply to each picture of the moving picture;
an extracting step for extracting a plurality of pictures from the moving picture at a predetermined interval, and
a coding step for encoding each picture of the moving picture based on a coding scheme selected in the control step,
wherein
in the control step selecting:
for a first picture included in the extracted plurality of pictures, the intraframe predictive coding scheme;
for a second picture included in the extracted plurality of pictures, a limited interframe predictive coding scheme in which reference pictures used in an interframe prediction are limited to either an intraframe predictive coded picture or a coded picture of another picture in the extracted plurality of pictures; and
for each picture that is not extracted in the extracting step, either the intraframe predictive coding scheme or a non-limited interframe predictive coding scheme, wherein the reference pictures are not limited as the reference pictures in the limited interframe predictive coding scheme.

13. An encoding method for encoding each picture composing a moving picture using either an intraframe predictive coding scheme or an interframe predictive coding scheme, the encoding method comprising:
a determination step for determining a number of pictures to be managed as a group;
a control step for selecting on a per-group basis a coding scheme to be applied to each picture; and
a coding step for encoding each picture based on the coding scheme selected in the control step, wherein
the control step selects:

for each group, the intraframe predictive coding scheme for a picture existing at the same position from the top of the group, and for each group in which the number of pictures determined in the determination step exceeds a predetermined value, a first limited interframe predictive coding scheme for a picture corresponding to a predetermined order from a picture included in the group for which the intraframe predictive coding scheme has been selected, wherein in the first limited interframe predictive coding scheme, reference pictures used in an interframe prediction are limited to pictures that are decoded only based on a picture in the same group for which the intraframe predictive coding scheme has been selected to an immediately-preceding picture.

14. A decoding method for receiving and decoding coded moving picture information, wherein the coded moving picture information includes:
(i) coded data composed of an I picture coded using the intraframe predictive coding scheme,
(ii) a first type of P picture coded using an interframe predictive coding scheme in which reference pictures used in an interframe prediction are limited to predetermined other pictures,
(iii) a second type of P picture coded using the interframe predictive coding scheme in which no such limitations as those applied to the interframe predictive coding scheme used for coding the first type of P picture are placed on reference pictures, and
(iv) coding information indicating a coding scheme used for the coding of each picture, the decoding method comprising:
an acquisition step for acquiring the information indicating a coding scheme from the moving picture information;
a decoding step for decoding coded data included in the moving picture information based on the coding information indicating the coding scheme acquired in the acquisition step;
a detection step for detecting an execution instruction for fast playback of the moving picture information; and
a playback control step for controlling the decoding step to decode only the I and first type of P pictures among the coded data when the execution instruction for fast playback is detected in the detection step, and for decoding the I, first type of P and second type of P pictures when the execution instruction for fast playback is not detected in the detection step.

15. A computer-readable recording medium retrievably storing a program that enables a computer to function as the encoding apparatus according to claim 1.

16. A computer-readable recording medium retrievably storing a program that enables a computer to function as the encoding apparatus according to claim 6.

17. A computer-readable recording medium retrievably storing a program that enables a computer to function as the decoding apparatus according to claim 9.

* * * * *